United States Patent
Holdampf et al.

[19]

[11] Patent Number: 5,662,377
[45] Date of Patent: *Sep. 2, 1997

[54] VEHICLE SEAT INTERLOCK SYSTEM

[75] Inventors: Carl J. Holdampf; Radesh Vangipuram, both of Farmington Hills, Mich.

[73] Assignee: Magna Lomason Corporation, Farmington Hills, Mich.

[*] Notice: The term of this patent shall not extend beyond the expiration date of Pat. No. 5,603,530.

[21] Appl. No.: 638,336

[22] Filed: Apr. 26, 1996

Related U.S. Application Data

[63] Continuation-in-part of Ser. No. 543,257, Oct. 18, 1995.
[51] Int. Cl.$^6$ ............................................. A47C 15/00
[52] U.S. Cl. ............... 297/238; 297/378.11; 297/378.12; 297/14
[58] Field of Search ............... 297/238, 14, 378.11, 297/378.12

[56] References Cited

U.S. PATENT DOCUMENTS

| | | | |
|---|---|---|---|
| 5,498,062 | 3/1996 | Holdampf | 297/238 |
| 5,529,381 | 6/1996 | Zhao et al. | 297/238 X |
| 5,540,479 | 7/1996 | Thomas et al. | 297/238 X |
| 5,564,780 | 10/1996 | Presser et al. | 297/238 |

*Primary Examiner*—Peter M. Cuomo
*Assistant Examiner*—Rodney B. White
*Attorney, Agent, or Firm*—Harness, Dickey & Pierce, P.L.C.

[57] ABSTRACT

A seat interlock system for use with a vehicular seat having a fold-down seatback equipped with a deployable integral child seat. An interlock mechanism is interdisposed between a seatback latching mechanism and a child seat latching mechanism. When the seatback is in its normal upright and latched condition, the interlock mechanism permits the child seat to be deployed. If the seatback is not latched, a movable member of the interlock mechanism prevents deployment of the child seat. Upon deployment of the integral child seat, the movable member interacts with the seatback latching mechanism in such a way as to prevent the seatback from being unlatched, thereby preventing folding of the seatback. The seat interlock system also includes an inertia responsive latching mechanism for preventing deployment of the integral child seat when the seatback is subject to a deceleration force exceeding a predetermined threshold value.

20 Claims, 13 Drawing Sheets

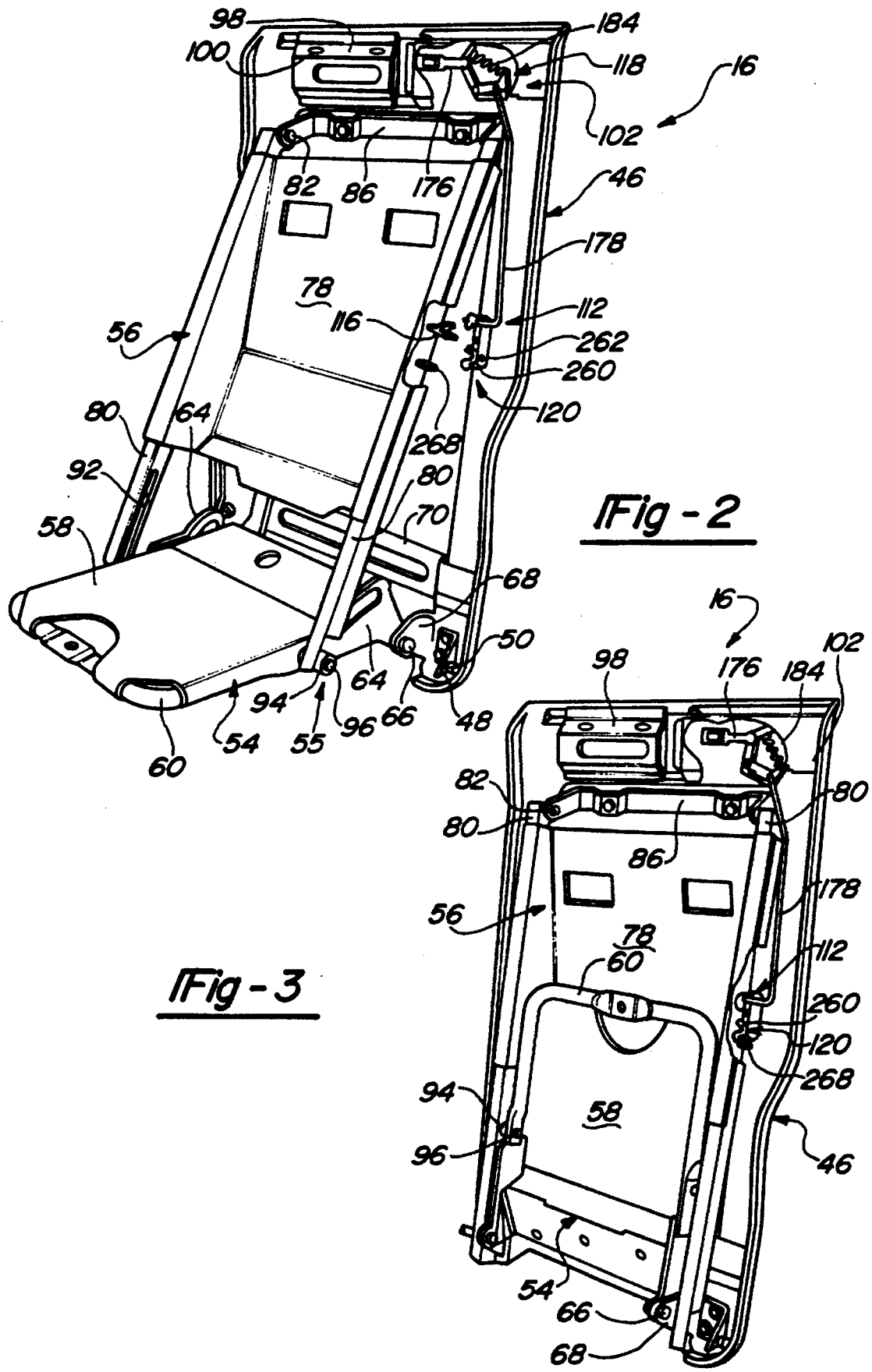

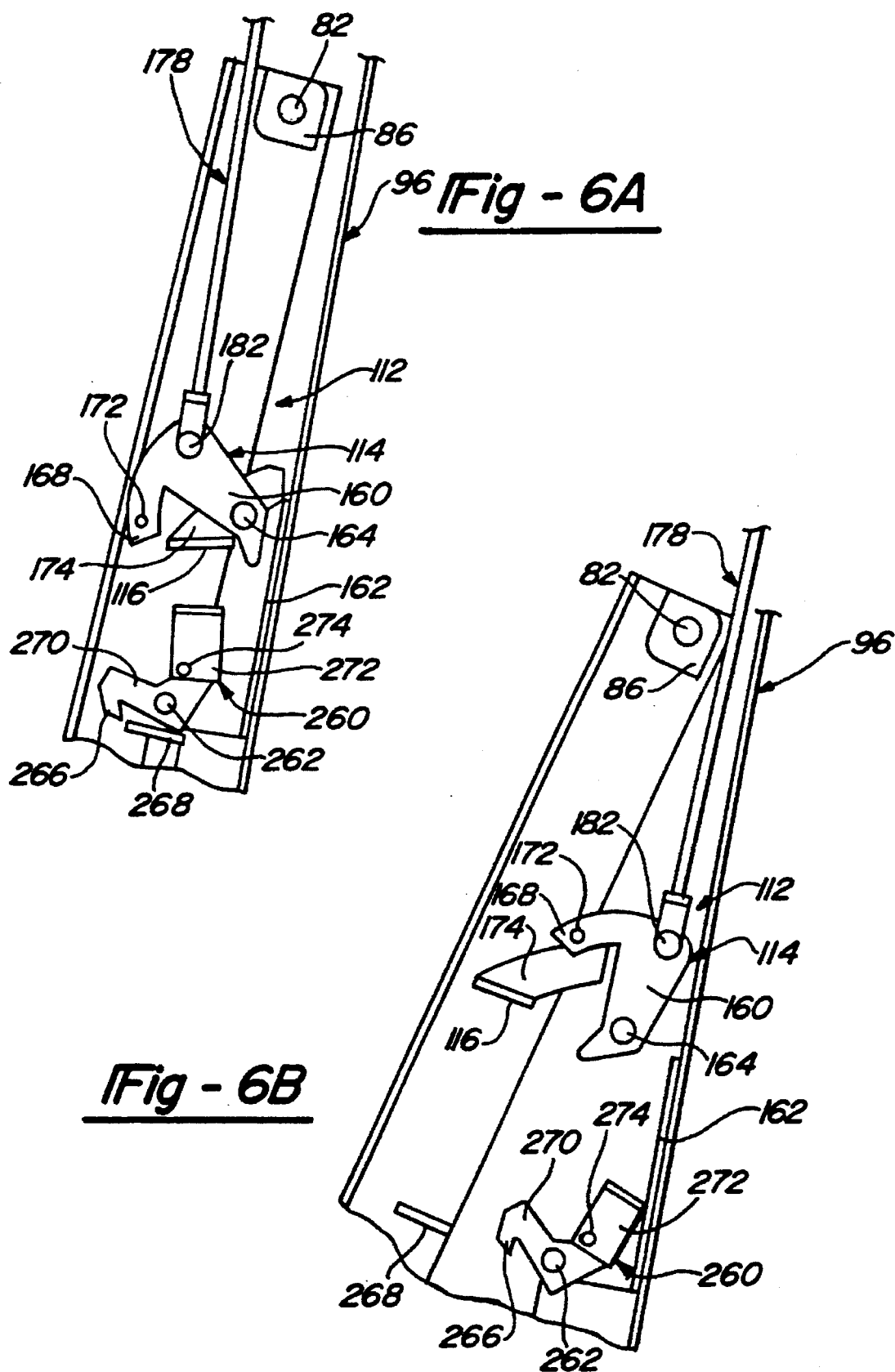

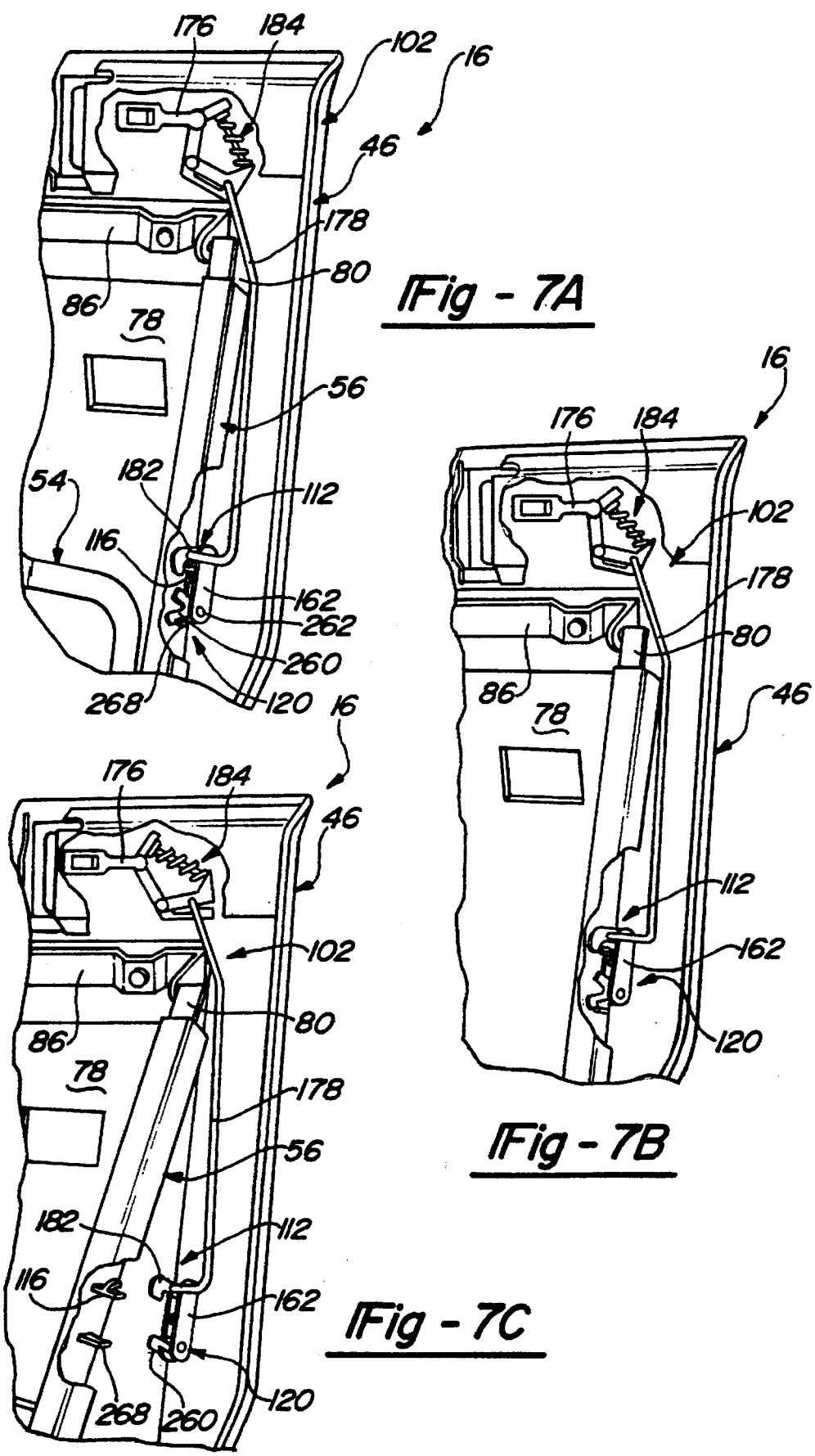

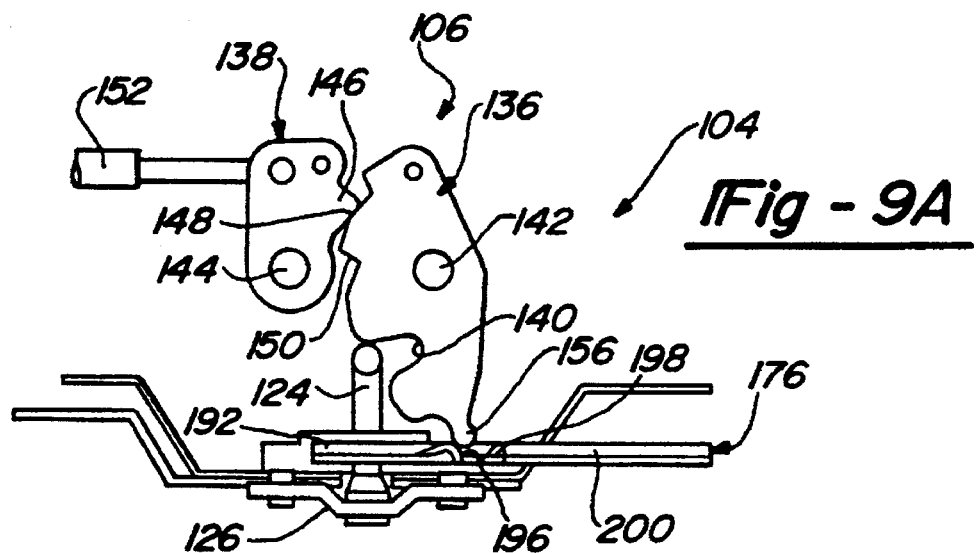
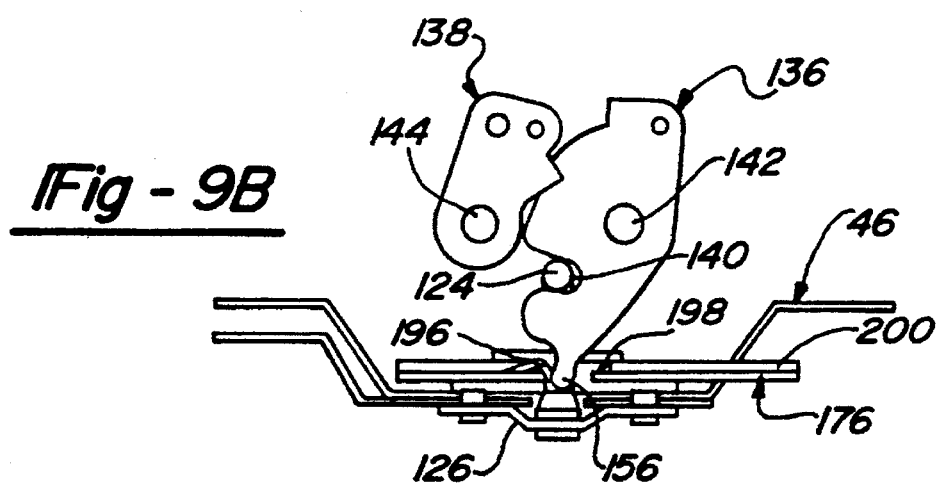
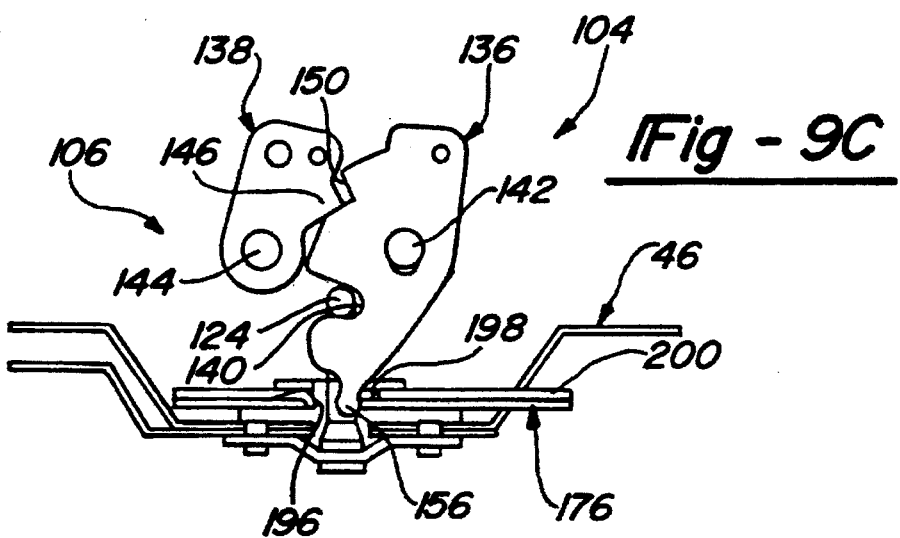

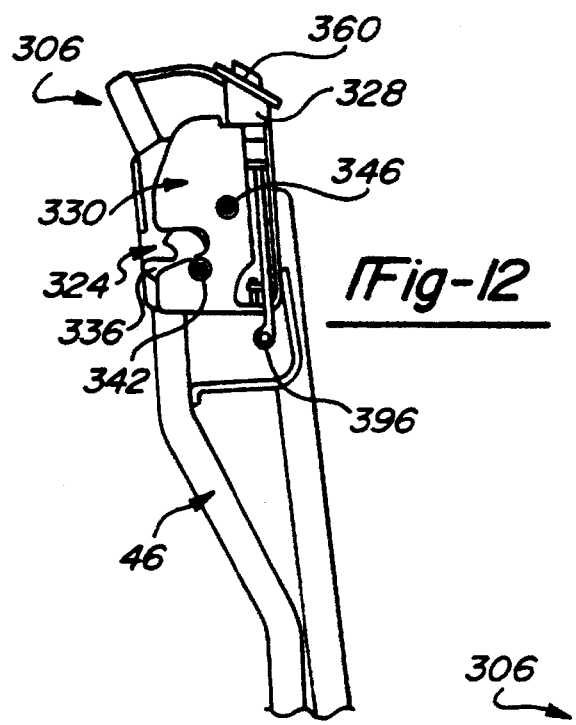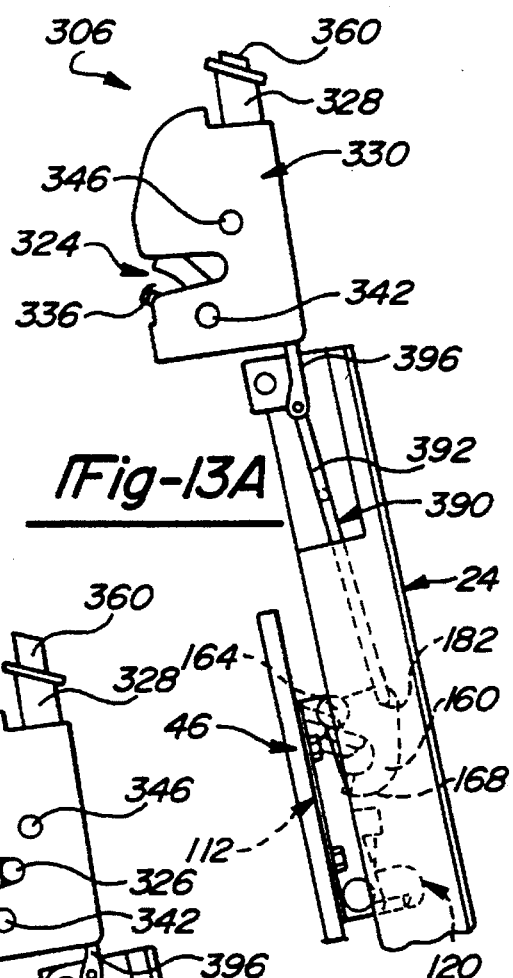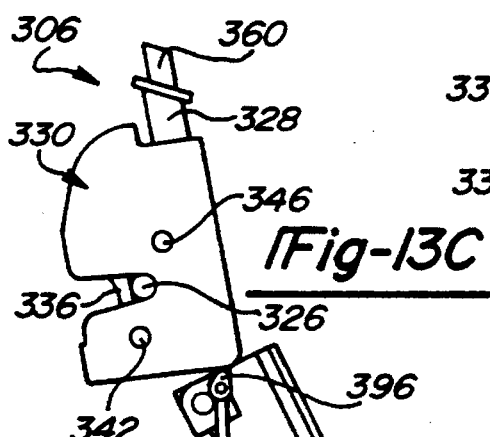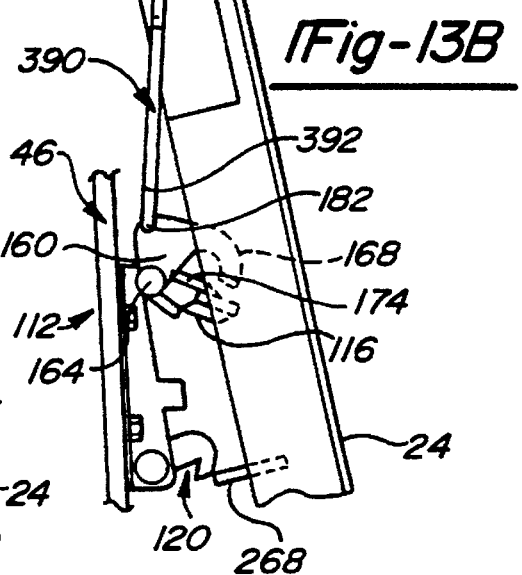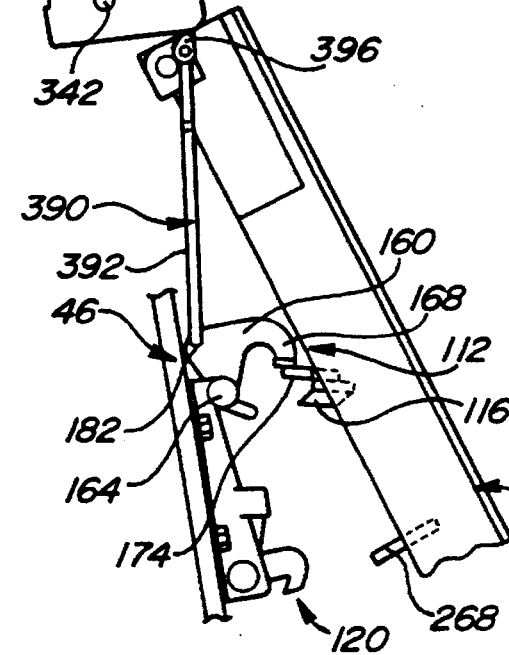

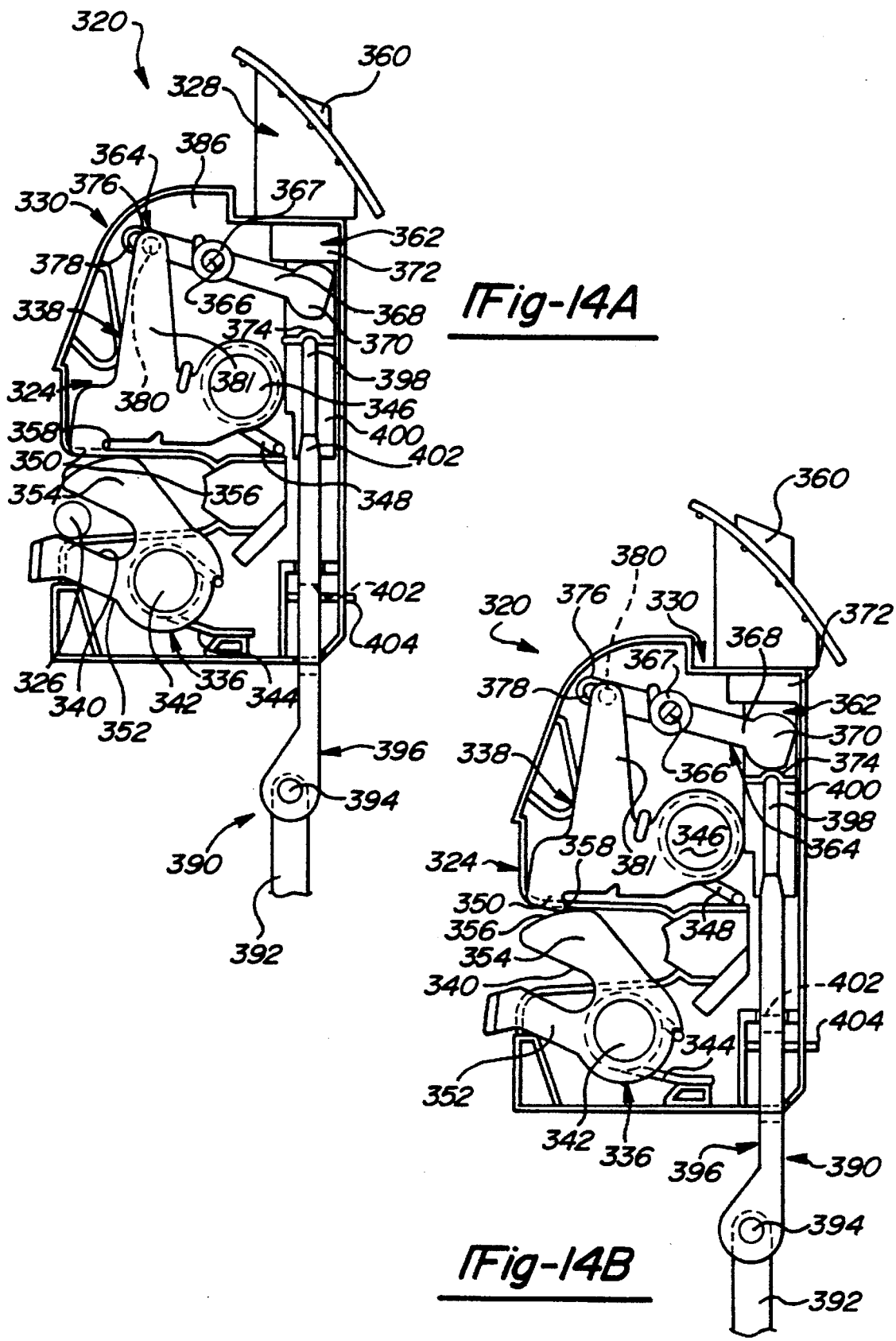

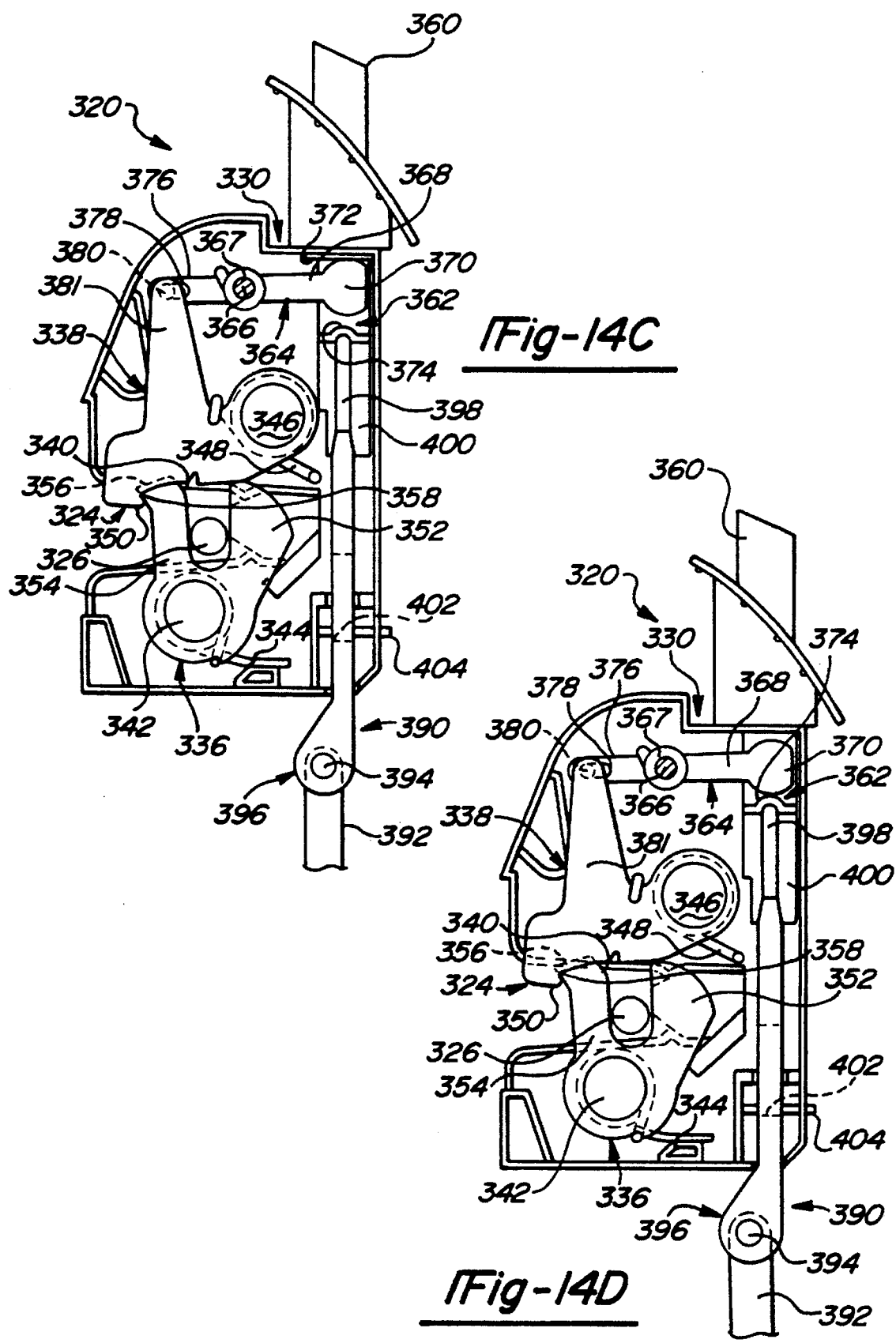

VEHICLE SEAT INTERLOCK SYSTEM

This is a continuation in part of U.S. Ser. No. 08/543,257, filed Oct. 18, 1995.

BACKGROUND OF THE INVENTION

The present invention relates to a seat interlock system for a vehicle seat having a folding seatback equipped with an integral child seat. The seat interlock system is operative to prevent deployment of the integral child seat when the seatback is unlatched from its upright position and is further operable to prevent the seatback from being unlatched when the integral child seat is deployed.

Virtually all motor vehicles are equipped with safety belt restraint systems for physically restraining the seat occupant when the vehicle is subjected to a high rate of deceleration which may occur, for example, during a motor vehicle collision or severe braking. While conventional safety belt restraint systems are well-suited for restraining adult passengers, it is a common practice to use a portable (i.e., "add-on") child seat having a belt-type harness for children under a given age and weight. For instance, most portable child seats are rated for children weighing forty pounds or less and are generally recommended for use with children under the age of four years. As is known, such portable child seats are placed on top of the vehicle seat and secured thereto using the existing vehicular safety belt restraint system.

In an effort to minimize the inconveniences associated with installing and/or stowing portable child seats, some vehicles are equipped with "integral" child seats that are built into the seatback of the vehicle seat. Typically, such integral child seats include a cushioned panel that is rotatably mounted to the seatback. In a stowed position, the cushioned panel forms a portion of the adult seatback. However, when the integral child seat is deployed, the cushioned panel forms a horizontal seat cushion that is adapted to support a child occupant seated thereon. Additional components of the integral child seat (i.e., belt harness, retractor, etc.) may also be included in the seatback.

It is also known to use a seating arrangement for the rear seat in motor vehicles that incorporates one or more fold-down seatback panels to provide enhanced access to the rear storage or trunk area. In such seating arrangements, the fold-down seatback panel is pivotally mounted at its lower end for rotation between an upright position and a forwardly folded position. When the seatback panel is articulated to its folded position, the rear seating area communicates with the space behind the seatback panel, effectively merging the trunk or storage area and the rear seating area. Conventionally, such fold-down seatback panels include a seatback latch mechanism that is operable for locking the seatback panel in its upright position and which must be selectively actuated to release the seatback panel for subsequent movement to its folded position.

As will be appreciated, motor vehicles equipped with seats having one or more deployable-type integral child seats are extremely popular in view of the enhanced conveniences provided. However, the operational requirements of an integral child seat can potentially conflict with the operational requirements of a fold-down seatback panel. As such, interlock systems have been developed which function to operably couple the seatback latch mechanism to the integral child seat. In operation, the interlock system prevents deployment of the integral child seat when the seatback panel is unlatched in addition to preventing release of the fold-down seatback panel when the integral child seat is deployed. Unfortunately, development of a common fold-down seatback panel for use with and without integral child seats has heretofore been problematic since such arrangements typically require that extensive modifications be made of the seatback latch mechanism due to incorporation of the interlock system. Furthermore, when installation of a seat having a fold-down seatback equipped with an integral child seat is desired, multiple components associated with the interlock system must be operatively installed within the vehicle before the seat can be installed.

In view of the above, a need clearly exists to develop a vehicle seat having a deployable-type integral child seat built into a foldable seatback panel which overcomes the shortcomings of known constructions and yet which can be readily adapted for use in various vehicular seating applications.

SUMMARY OF THE INVENTION

Accordingly, a primary object of the present invention is to provide an improved seat interlock system for a vehicle seat of the type including a fold-down seatback that can be selectively rotated from an upright position to a forwardly folded position to provide access to the space rearward of the seatback. The fold-down seatback is equipped with an integral child seat which can be articulated between a stowed position concealed in the seatback and a deployed position.

It is a related object of the present invention to provide a seat interlock system operative to prevent deployment of the integral child seat unless the fold-down seatback is latched in its upright position. Likewise, it is also an object of the present invention for the seat interlock system to prevent the fold-down seatback from being released from its upright position when the integral child seat is deployed.

It is yet another object of the present invention to provide a seat interlock system equipped with an inertia responsive latching mechanism that is operative to prevent deployment of the integral child seat when the fold-down seatback is latched in its upright position and the vehicle seat is subjected to an inertial force exceeding a predetermined threshold value which may occur, for example, during a frontal impact or a severe braking situation.

These and other objects are provided by an interlock system for a vehicle seat which includes a fold-down seatback equipped with an integral child seat. The interlock system is operative for coordinating actuation of a seatback latching mechanism and a child seat latching mechanism. In a presently preferred embodiment, a first movable latch element associated with the seatback latching mechanism is operably interconnected via an interlock mechanism to a second movable latch element associated with the child seat latching mechanism. Thus, movement of the first latch element between a latched position and a released position results in movement of the second latch element between a released position and a latched position. By coordinating the movement of the latch elements, minimal, if any, redesign of a conventional seatback latching mechanism is required. As a result, when an integral child seat is desired as an option, a seatback constructed in accordance with the present invention can be quickly and easily installed during vehicle manufacture without the need to independently install multiple components attached to the body structure.

The present invention is directed to a seat interlock system for a seatback module. The seatback module includes a panel assembly that is adapted to be mounted within the motor vehicle for articulation between an "upright" position and a forwardly rotated or "folded" position. The seatback module further includes an integral child seat mounted to the panel assembly for articulation between a "stowed" position and a "deployed" position. The interlock system includes a first latching mechanism operatively arranged for releasably latching the panel assembly in its upright position. The seat interlock system further includes a second latching mechanism mounted for movement with the panel assembly and which is operably arranged for selectively latching the integral child seat to the panel assembly to prevent deployment of the integral child seat. The seat interlock system further includes an interlock mechanism operably interconnecting the first and second latching mechanisms and which is operable for selectively prohibiting concurrent movement of the panel assembly and deployment of the integral child seat. Finally, the seatback module is additionally equipped with a third latching mechanism. The third latching mechanism is inertia responsive for automatically preventing deployment of the integral child seat when the vehicle is subjected to a deceleration force exceeding a predetermined threshold value.

BRIEF DESCRIPTION OF THE DRAWINGS

Additional objects, features and advantages of the present invention will become apparent from analysis of the following written specification, the appended claims and the accompanying drawings in which:

FIG. 2 is a partially cut-away perspective view of one of the fold-down seatback modules shown in FIG. 1, with upholstery and cushions removed for clarity, showing its underlying seatback panel assembly in an "upright" position and the integral child seat in a "deployed" position;

FIG. 3 is a view similar to FIG. 2 illustrating the seatback panel assembly in the "upright" position and the integral child seat in a "stowed" position;

FIGS. 6A and 6B are side views showing components of the child seat latching mechanism and the inertia responsive latching mechanism in greater detail;

FIGS. 7A through 7C represent a series of partially cut-away views of the fold-down seatback module illustrating the interlock system when the panel assembly is released from its upright position and the integral child seat is latched in its stowed when the seatback panel assembly is latched in its upright position and the integral child seat is moved to a fully deployed position (FIG. 7C);

FIGS. 9A through 9C represent a series of views, corresponding with the views of FIGS. 8A through 8C, further illustrating the operative connection between the interlock mechanism with the seatback latching mechanism;

FIG. 12 is a side view of one of the fold-down seatback panel assemblies shown in FIG. 11, with upholstery and cushions removed for clarity;

FIGS. 13A-13C represent a series of partial side views of the seat interlock system of the vehicle seat unit of the second preferred embodiment, illustrating the seat-back latching mechanism and the child seat latching mechanism when the seatback panel assembly is released from its upright position and the integral child seat is latched in its stowed position (FIG. 13A), when the seatback panel assembly is latched in its upright position and the integral child seat is in its stowed position (FIG. 13B), and when seatback panel assembly is latched in its upright position and the integral child seat is moved to its deployed position (FIG. 13C); and FIGS. 14A-4D represent a series of enlarged side views of the latch mechanism of FIGS. 13A through 13C and illustrated with the housing cover removed for purposes of illustration, and more particularly illustrating the seatback latch mechanism when the plunger is depressed for unlatching the seatback panel assembly from its upright position and the integral child seat is latched in its stowed position (FIG. 14A), with the seatback panel assembly released from its upright position and the integral child seat is in its stowed position (FIG. 14B), when the seatback panel assembly is latched in its upright position and the integral child seat is in its stowed position (FIG. 14C), and when the seatback panel assembly is lached in its upright position and the integral child seat is moved to its deployed postition (FIG. 14D).

DETAILED DESCRIPTION OF THE PREFERRED EMBODIMENT

Figure 1:
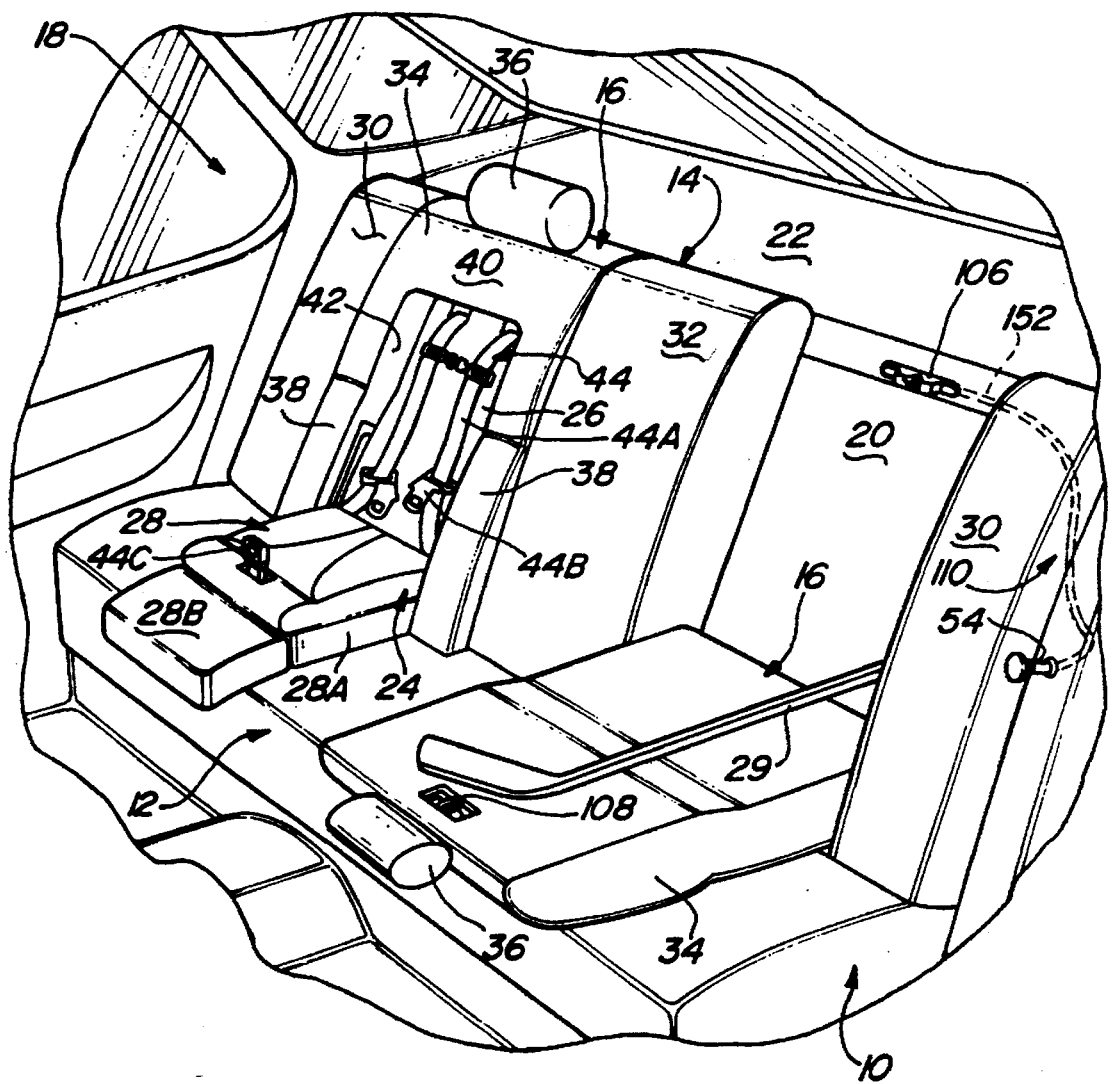
FIG. 1 is a partial perspective view of a rear seating area in an exemplary motor vehicle illustrating a rear seat incorporating a pair of fold-down seatback modules constructed in accordance with the teachings of a first preferred embodiment of the present invention.
Figure 4:
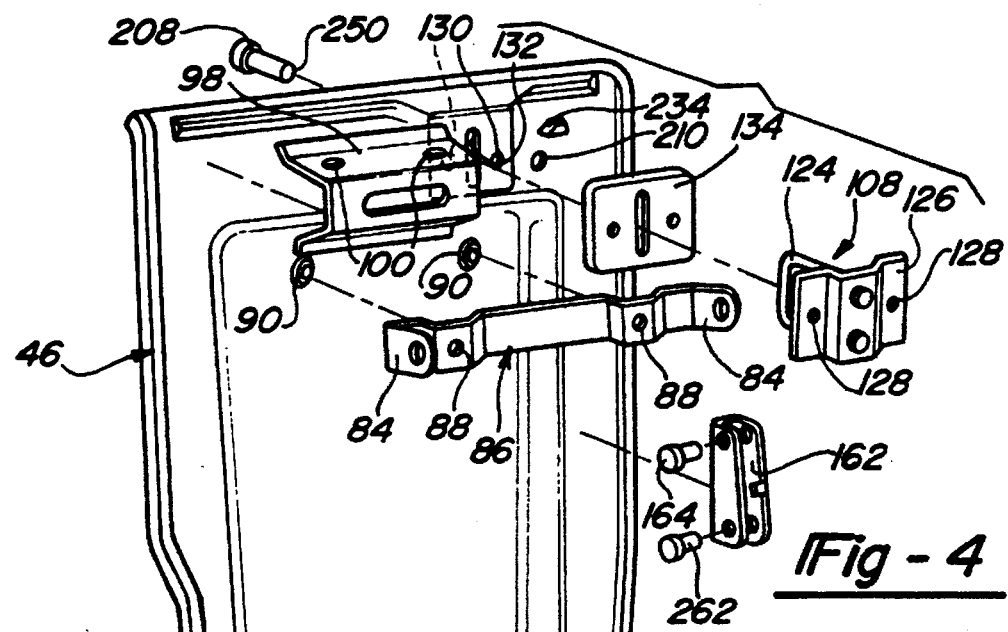
FIG. 4 a partial exploded view of the seatback panel assembly shown in FIGS. 2 and 3.

The present invention is directed to a seat interlock system for a vehicle seat having a fold-down seatback equipped with a deployable integral child seat. More specifically, the present invention discloses a seat interlock system which is particularly well-suited for use in motor vehicle rear seat applications having an enclosed storage area that is separated from a rear seating area by the fold-down seatback. However, it is to be understood that while the present invention is hereinafter disclosed in association with the particular vehicle seating arrangements shown, such uses are merely exemplary representations of the general types of environments in which the present invention may be incorporated.

Referring now generally to the drawings in which like elements are identified with identical reference numerals throughout, a first preferred embodiment will be described with reference to FIGS. 1–10. With initial reference to FIG. 1, a rear seat 10 for a passenger-type motor vehicle is shown. Rear seat 10 is shown to include a seat cushion 12 and a seatback 14. Seatback 14 includes a pair of fold-down seatback panels 16 that are pivotally mounted to structural portions of the vehicle. As shown, seatback panels 16 are installed in a rear seating area 18 of the vehicle so as to be located forward of a trunk storage area 20 and above seat cushion 12. Seatback panels 16 are particularly well-adapted for incorporation into rear seating applications wherein the motor vehicle has a rear package shelf 22. However, as will become apparent during the remainder of this detailed description, the present invention is not limited to use with rear seat systems having a package shelf 22. Further, those skilled in the art will understand that rear seat 10 may alternatively be assembled with only one fold-down seatback panel 16 if so required for a particular seating application.

With continued reference to FIG. 1, each seatback panel 16 will be understood to be mounted to the motor vehicle for pivotal movement between an "upright" position adjacent to package shelf 22 and a forwardly "folded" position adjacent to seat cushion 12. Each seatback panel 16 includes an integral child seat 24 having a backrest 26 and a seat 28 that are interconnected together for coordinated movement between a "stowed" position and a "deployed" position. As shown, seat 28 includes a first or lower cushion 28A and a second or upper cushion 28B that are flexibly connected together. However, this construction is merely exemplary since seat 28 could be a single fold-down cushion or, in the alternative, also include a fold-up headrest in combination with the fold-down cushion. Regardless, the novel features of this invention are clearly applicable to use with virtually any type of integral child seat.

One of seatback panels 16 (shown on the left side of FIG. 1) is illustrated latched in its upright position with its corresponding integral child seat 24 extended to its deployed position. In contrast, the other seatback panels 16 (shown on the right side of FIG. 1), is illustrated in its folded position with its corresponding integral child seat retained in its stowed position. As such, folding of seatback panel 16 permits access between rear seating area 18 and trunk storage area 20. Thus, trunk storage area 20 is extended for additional storage or to accommodate items that may otherwise not fit therein. For example, a hockey stick 29 is illustrated to extend between trunk storage area 20 and rear seating area 18.

With continued reference to FIG. 1, each seatback panel 16 is shown incorporated into a recess formed between one of a pair of end cushions 30 and a central cushion 32. Each fold-down seatback panel 16 is further shown to include a seatback cushion 34 and a headrest 36. Seatback cushion 34 includes a pair of lateral side bolster segments 38 connected by a common upper bolster segment 40 which together define a recessed opening 42 within which seat 28 and backrest 26 of integral child seat 24 are disposed for movement between their respective deployed and stowed positions. With seatback panel 16 in its upright position and integral child seat 24 stowed, lower and upper cushions 28A and 28B are confined within recessed opening 42 for establishing a continuous back support surface with seatback cushion 34, its adjacent end cushion 30, and central cushion 32. Upon deployment of integral child seat 24, seat 28 is lowered and backrest 26 is caused to concurrently move to a reclined position. Such deployment causes side bolsters 38 to extend forwardly of end cushion 30 and center cushion 32 in coordination with movement of backrest 26 to its reclined position to provide lateral support to a child retained thereon. A harness-type restraint 44 is exposed upon deployment of integral child seat 24 and includes retractable belts 44A on which tongue plates 44B are supported for releasably engaging a buckle component 44C.

Prior to turning to the details of the construction and operation of the seat interlock system of the present invention, a further understanding of fold-down seatback panel 16 with which the seat interlock system is specifically adapted to cooperate is warranted. To more clearly illustrate the novel structure and operational features of the present invention, one of seatback panels 16 is shown in FIGS. 2 through 10 with its child restraint components removed as well as its upholstery and padding. Fold-down seatback panel 16 is a modular assembly including a panel assembly 46 which is adapted to be pivotally mounted to the existing or modified frame structure or chassis of the motor vehicle. Preferably, pivot brackets 48 are fixed to the lower lateral edges of panel assembly 46 and are each pivotally connected via a hinge member 50 to suitable mounting structure within the vehicle. It will be appreciated that modifications, reinforcements and/or additions may be made to panel assembly 46 and/or to the vehicle mounting structure for the purpose of providing adequate load carrying and load transfer characteristics. Depending on the particular seating application, integral child seat 24 can be stowed entirely within upholstered seatback cushion 34 or within a portion of trunk storage area 20 located immediately rearward thereof.

Referring to FIGS. 2 and 3, integral child seat 24 is illustrated to include a seat frame 54, a backrest frame 56, and a movement coordinating mechanism 55 that is operable for coordinating the concurrent movement of backrest frame 56 (and backrest 26) in response to movement of seat frame 54 (and seat 28) as integral child seat 24 is moved between its fully deployed position (FIG. 2) and its stowed position (FIG. 3). According to its most basic function, movement coordinating mechanism 55 is operable such that pivotal movement of seat frame 54 from its raised position (FIG. 3) to its lowered position (FIG. 2) is adapted to cause concurrent pivotal movement of backrest frame 56 from a generally vertical position when integral child seat 24 is in its stowed position to an angled or reclined position when integral child seat 24 is in its deployed position. Obviously, movement coordinating mechanism 55 provides for the reverse movement of the components when integral child seat 24 is raised from its deployed position to its stowed position.

Seat frame 54 is located within lower cushion 28A of seat 28 and is shown to include a rigid seat pan 58 attached to a U-shaped tubular frame member 60. Each free end of U-shaped tubular frame member 60 is flattened and is fixedly secured to one end of a mounting bracket 64, the other end of which is secured via a hinge pin 66 to a flange segment 68 of a lower pivot bracket 70 that is secured to panel assembly 46. As best seen from FIG. 4, lower pivot bracket 70 includes bracket segments 72 having mounting holes 74 that are alignable with mounting holes 76 on panel assembly 46 for receipt of suitable fasteners. Backrest frame 56 includes a rigid back support pan 78 that is attached to a pair of laterally-spaced swing arms 80. Each swing arm 80 is pivotally attached at its uppermost end via a hinge pin 82 to an angled flange segment 84 of an upper pivot bracket 86. Upper pivot bracket 86 is secured to panel assembly 46 via fasteners extending through aligned mounting holes 88 and 90.

As noted, movement coordinating mechanism 55 is provided for coupling backrest frame 56 to seat frame 54. In particular, the lower end of each swing arm 80 is formed to include an elongated guide slot 92. A roller 94 mounted on a follower pin 96 extends outwardly from each lateral edge of seat frame 54 and is retained for sliding movement within a corresponding guide slot 92. As such, pivotal "fold-out" movement of seat frame 54 relative to panel assembly 46 about lower hinge pins 66 results in concurrent pivotal movement of backrest frame 56 about upper hinge pins 82 due to sliding movement of rollers 94 in guide slots 92. Swing arms 80 are disposed within side bolsters 38 of seatback cushion 34 for causing fore and aft movement thereof in response to pivotal movement of backrest frame 56. Panel assembly 46 is further shown to include a headrest mounting bracket 98 have apertures 100 for receiving the posts (not shown) of headrest 36. It will further be appreciated by those skilled in the art that the particular underlying frame structure of integral child seat 24 is merely exemplary. That is, differing construction and arrangement of the components for integral child seats are possible without departing from the scope of the present invention.

According to the first preferred embodiment, a seat interlock system 102 is operable for preventing deployment of integral child seat 24 when panel assembly 46 is not securely latched to a first or seatback latching mechanism 104 in its upright position. As will be detailed, seatback latching mechanism 104 includes: a latch assembly 106 mounted to shelf 22; a striker assembly 108 fixed to panel assembly 46 and which is engageable with latch assembly 106 for locking seatback panel 16 in the upright position; and a release mechanism 110 for permitting selective release of seatback panel 16 from its upright position. Thus, seatback latching mechanism 104 is operable in a "locked" mode for holding seatback panel 16 in its upright position and in an "unlocked" mode for permitting seatback panel 16 to be folded. Moreover, seat interlock system 102 includes a second or child seat latching mechanism 112 which functions in a "latched" mode for mechanically locking integral child seat 24 in its stowed position in response to actuation of release mechanism 110 for shifting seatback latching mechanism 104 from its locked mode to its unlocked mode. Child seat latching mechanism 112 further functions in a "released" mode for permitting deployment of integral child seat 24 when seatback latching mechanism 104 is shifted to its locked mode. As will also be detailed, child seat latching mechanism 112 includes a latch assembly 114 mounted to panel assembly 46 that is selectively engageable with a striker 116 mounted to backrest frame 56. Interlock system 102 also includes an interlock mechanism 118 operably interconnecting latch assembly 106 of seatback latching mechanism 104 to latch assembly 114 of child seat latching mechanism 112 to coordinate shifting thereof between their respective modes in the manner hereinafter detailed. Finally, seat interlock system 102 includes an inertia-responsive latching mechanism 120 that is operative for automatically securing integral child seat 24 in its stowed position when the motor vehicle is subjected to significant deceleration forces.

As noted, seatback latching mechanism 104 preferably includes latch assembly 106 and striker assembly 108. Latch assembly 106 and striker assembly 108 are operatively arranged for releasably locking panel assembly 46 in its upright position adjacent rear package shelf 22. As illustrated, latch assembly 106 includes a housing 122 which is fixedly secured to a forward edge of rear package shelf 22. Striker assembly 108 is shown to include a U-shaped striker bar 124 that is fixed to a backing plate 126. Backing plate 126 is, in turn, attached to panel assembly 46 via fasteners 127 driven through alignable mounting bores 128 and 130 such that striker bar 124 extends through an elongated aperture 132 in panel assembly 46. In the embodiment illustrated, an aperture spacer plate 134 is interdisposed between panel assembly 46 and backing plate 126.

As best seen from FIGS. 9A–9C, latch assembly 106 is shown to include a latching element in the form of a locking pawl 136 which cooperates with a spring-biased cam plate 138 for releasably retaining U-shaped striker bar 124 within a lock slot 140 formed in locking pawl 136. More particularly, locking pawl 136 is mounted within housing 122 for pivotal movement about a pivot pin 142. A biasing mechanism (not shown) normally biases locking pawl 136 in a first direction (i.e., counterclockwise in FIGS. 9A–9C). Cam plate 138 is likewise mounted for pivotal movement about a pivot pin 144 and is normally biased by a biasing mechanism (not shown) in a direction toward locking pawl 136 for maintaining engagement of a detent projection 146 with portions of a profiled outer surface of locking pawl 136. Pawl 136 is movable about pivot pin 142 between an unlatched position shown in FIG. 9A whereat striker bar 124 is released from lock slot 140 and cam plate detent projection 146 rides on a surface segment 148 of locking pawl 136, and the latched positions shown in FIGS. 9B and 9C whereat striker bar 124 is positioned within lock slot 140 and detent projection 146 is located in or adjacent to a detent groove 150 on locking pawl 136. Moreover, its spring biasing mechanism normally urges locking pawl 136 toward its unlatched position of FIG. 9A. As will be detailed, FIG. 9B illustrates the latched position of locking pawl 136 when integral child seat 24 is in its stowed position and FIG. 9C illustrates the latched position of locking pawl 136 when integral child seat 24 is in its deployed position.

To facilitate movement of locking pawl 136 from its latched position (FIG. 9B) to its released position (FIG. 9A), release mechanism 110 includes a bowden cable 152 connecting cam plate 138 to a manually-operable spring-biased release handle 154. As such, actuation of release handle 154 operates to move cable 152 which, in turn, forcibly rotates cam plate 138 away from locking pawl 136 for permitting its biasing mechanism to move locking pawl 136 to its released position. As will be detailed below, locking pawl 136 includes a forwardly extending pawl extension 156 which cooperates with interlock mechanism 118 for prohibiting deployment of integral child seat 24 when locking pawl 136 is in its unlatched position as well as for prohibiting release of seatback panel 16 unless integral child seat 24 is returned to its stowed position. It will be understood by those skilled in the art that the pawl and cam arrangement of latch assembly 106 is generally conventional in construction with the exception of providing pawl extension 156.

As best seen from FIGS. 5, 6A–6B, and 7A–7C, latch assembly 114 of child seat latching mechanism 112 is shown mounted to seatback panel 16 and is operative via interlock mechanism 118 for releasably maintaining integral child seat 24 in its stowed position when seatback latching mechanism 104 is unlatched. Child seat latching mechanism 112 is shown to include latch assembly 114 having a hooked lock plate 160 pivotally mounted to panel assembly 46 and striker 116 that is mounted to backrest frame 56 of integral child seat 24. In the embodiment illustrated, hooked lock plate 160 is pivotally attached to a mounting bracket 162 through a pivot pin 164 and fastener 166. Mounting bracket 162 is fixedly secured to panel assembly 46. Lock plate 160 includes a distal hooked portion 168 configured to be selectively engageable with striker 116. As will be detailed, latched engagement of striker 124 within lock slot 40 of locking pawl 136 causes locking pawl 136 to rotate from its unlatched position (FIG. 9A) to its latched position (FIG. 9B) in opposition to the biasing exerted thereon. Such rotation of locking pawl 136 causes interlock mechanism 118 to forcibly rotate lock plate 160 from a latched position whereat distal hooked portions 168 captures striker 116 to a released position whereat hooked portion 168 is displaced from striker 116. Accordingly, such action results in child seat latching mechanism 112 being shifted from its latched mode into its released mode so as to permit subsequent deployment of integral child seat 24. Conversely, with integral child seat 24 in its stowed position, release mechanism 110 can be actuated to release striker 124 from lock slot 140, whereby locking pawl 136 is free to rotate in the first direction to its unlatched position. This, in turn, causes interlock mechanism 118 to rotate lock plate 160 from its unlatched position to its latched position, thereby preventing deployment of integral child seat 24 after seatback panel 16 is released.

Hooked lock plate 160 is further illustrated to include a cam follower 172 extending therefrom that is adapted to cooperate with a cam plate 174 carried by backrest frame 56 of integral child seat 24. Preferably, cam plate 174 is located close to striker 116 and is mounted on swing arm 80. Functionally, cam plate 174 is adapted to engage cam follower 172 to forcibly rotate hooked lock plate 160 upwardly when integral child seat 24 is moved outwardly from its stowed position toward its deployed position. Such action is shown in FIG. 6B. Moreover, due to the connection of seatback latching mechanism 104 to child seat latching mechanism 112 via interlock mechanism 118, such movement of lock plate 160 causes coordinated movement of locking pawl 136 from its first latched position shown in FIG. 9B to its second latched position shown in FIG. 9C for maintaining striker bar 128 in locked engagement within lock slot 140.

Interlock mechanism 118 is illustrated to include a means for coordinating selective operation of seatback latching mechanism 104 and child seat latching mechanism 112. In particular, interlock mechanism 118 includes a slide plate 176 operably associated with locking pawl 136, a connecting rod 178 having one of its ends 180 mounted in an aperture 182 in lock plate 160, and a bell crank device 184 interconnecting slide plate 176 to a second end 186 of connecting rod 178. Slide plate 176 is mounted for horizontal sliding movement relative to panel assembly 46 by a retainer 188. Retainer 188 has an aperture 190 through which striker 124 extends and is mounted to striker assembly 108 via fasteners 127 extending through mounting holes 191. Slide plate 176 includes a body segment 192 having a generally rectangular aperture 194 for receiving pawl extension 156 of locking pawl 136 therein. Rectangular aperture 194 is partially defined by first and second stop surfaces 196 and 198. A neck segment 200 of slide plate 176 includes an elongated aperture 202 to facilitate pivotal and sliding attachment to bellcrank device 184 as will become apparent below.

With reference to FIGS. 5 and 10A-10C, bellcrank device 184 is illustrated as having a two-part construction including an inner bellcrank link 204 and an outer bellcrank link 206. Inner and outer links 204 and 206 are pivotally mounted for rotation about a common axis defined by a cylindrical pivot post 208 extending through an aperture 210 formed in panel assembly 46. As shown, inner link 204 is formed to include a first end 212 having an aperture 214 sized for journally receiving pivot post 208. Outer link 206 is generally C-shaped and includes an aperture 216 for journally receiving pivot post 208. A cylindrical drive post 220 extends from an intermediate portion of outer link 206 and is adapted to be retained within elongated aperture 202 in slide plate 176. A second end 222 of inner link 204 is resiliently interconnected with an upper end 224 of outer link 206 by a helical coil spring 226 which functions to normally bias link ends 222 and 224 to a predetermined spaced-apart relationship through balancing of the force between the link ends 222 and 224. Helical coil spring 226 is precompressed to accommodate tolerance stacks. In addition, helical coil springs 226 functions to limit the amount of force transferred by bellcrank device 184.

Figure 5:
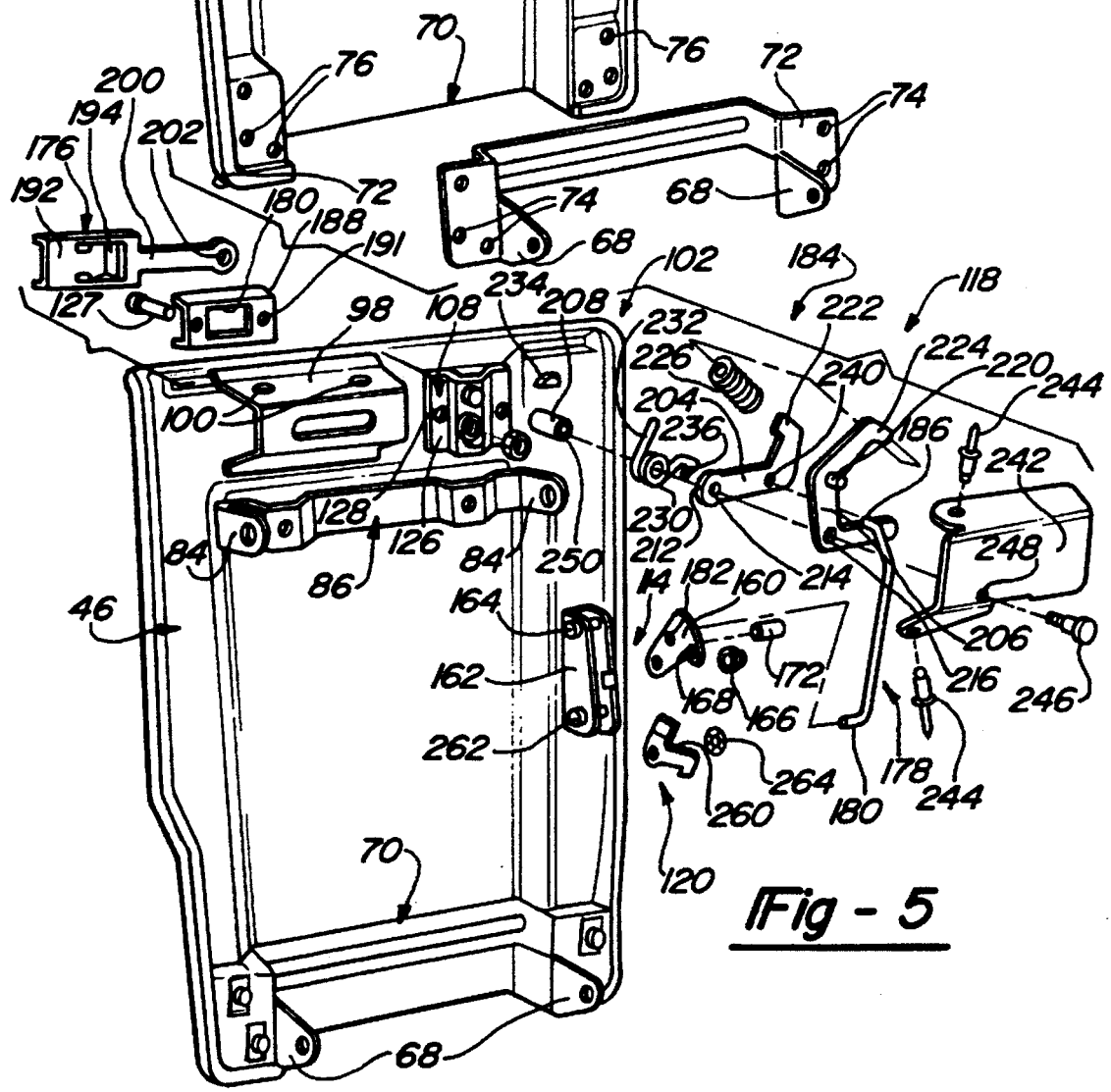
FIG. 5 is another partially exploded perspective view of the seatback panel assembly shown in FIGS. 2 and 3 illustrating the components associated with the seat interlock system in greater detail.

As further illustrated in FIG. 5, a torsion spring 230 surrounds a portion of pivot post 208 and has a first leg 232 engaging a projection 234 on panel assembly 46 and a second leg 236 engaging an upper surface of inner link 204. As such, torsion spring 230 functions to normally bias bellcrank device 184 in a clockwise direction. Rod 178 interconnects bellcrank device 184 and latch assembly 114 of child seat latching mechanism 112 via its connection between an aperture 240 in inner link 204 and aperture 182 formed in hooked lock plate 160. A shield 242 is attached to panel assembly 46 through fasteners 244 and functions to conceal the moving parts of bellcrank device 184. A threaded fastener 246 passes through an aperture 248 in shield 242 and engages a correspondingly threaded bore 250 formed in the terminal end of pivot post 208 for retaining the components of interlock mechanism 118 in their assembled orientation.

With continued reference to FIGS. 5, 6A, and 6B, interlock system 102 is shown to also include inertia responsive latching mechanism 120 for prohibiting deployment of integral child seat 24 under certain high deceleration conditions when integral child seat 24 is in its stowed position and child seat latching mechanism 112 is unlatched. Inertia latching mechanism 120 includes a weighted latch member 260 which is mounted to mounting bracket 162 via a pivot pin 262 and fastener 264 and which is normally biased by gravity toward a released position shown in FIG. 6B. In its locked position, a hooked end 266 of latch member 260 captures striker plate 268 carried by backrest frame 56 of integral child seat 24.

As illustrated, latch member 260 includes a hooked segment 270 and a counterweighted segment 272. The center of gravity, schematically identified by symbol 274 in FIGS. 6A and 6B, of latch member 260 is located above and rearward of (i.e., offset) the rotational axis defined by pivot pin 262. More specifically, the center of gravity 274 is located relative to pivot pin 262 such that gravitational force normally urge latch member 260 to be maintained in its released position, thereby permitting unrestricted deployment of integral child seat 24 when panel assembly 46 is latched. When integral child seat 24 is rotated to its stowed position, a lower corner 276 of latch member 260 is struck by a striker plate 268, thereby rotating latch member 260 to its latched position. If the seatback panel 16 is not subject to a deceleration force, latch member 260 rotates to its unlatched position upon initial deployment of integral child seat 24, thereby displacing striker plate 268 from lower corner 276 and allowing striker plate 268 to pass hooked end 266 of latch member 260. However, when a deceleration force is applied to seatback panel 16 that exceeds a predetermined threshold value, such as during a frontal impact or severe braking situation, the resulting inertial force causes latch member 260 to rotate counterclockwise (FIGS. 6A and 6B) about pivot pin 262 to its locked position. When rotated to this locked position, latch member 260 captures striker plate 268 and prohibits deployment of integral child seat 24 until the excessive deceleration forces are eliminated and latch member 260 normally returns to its released position.

Figure 8A:
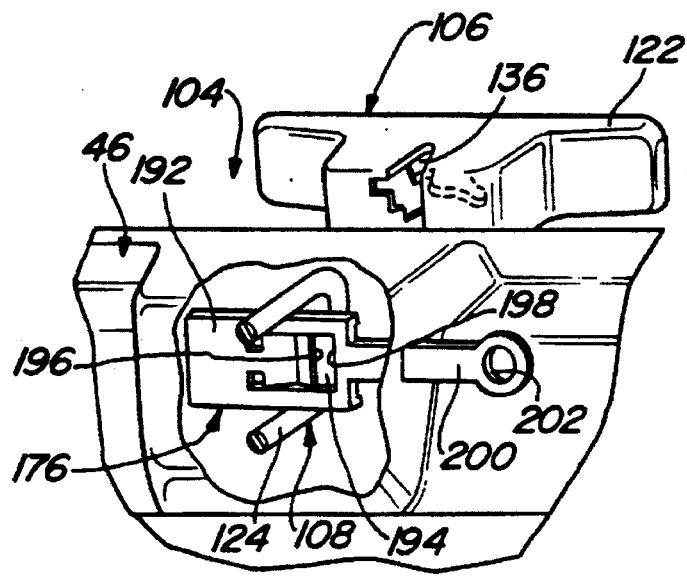
FIGS. 8A through 8C represent a series of views corresponding with the views of FIGS. 7A through 7C and illustrating the operative connection between the seatback latching mechanism and a portion of the interlock mechanism.
Figure 8B:
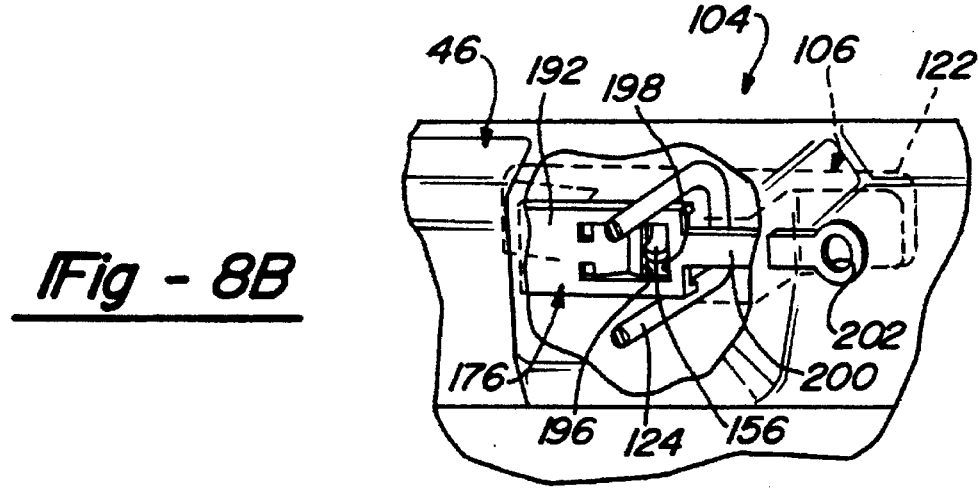
Figure 8C:
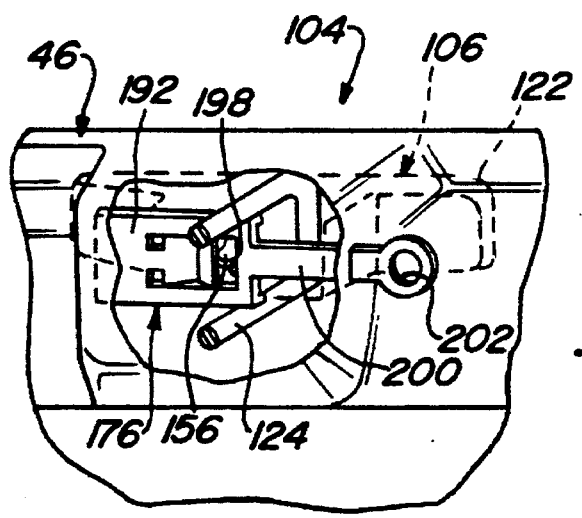
Figure 10A:
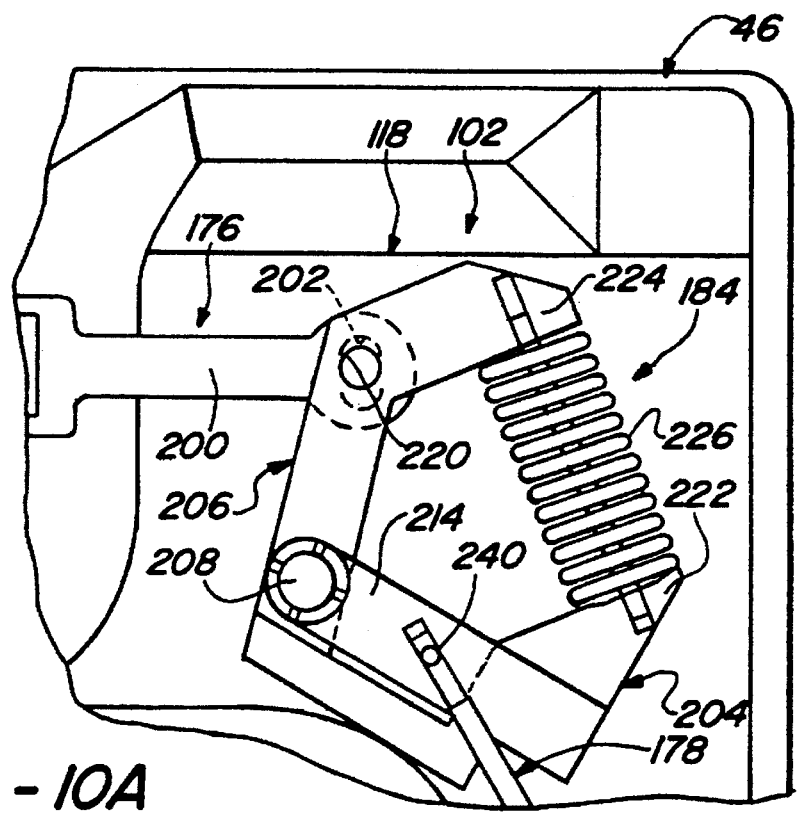
FIGS. 10A through 10C represent a series of views corresponding with the views of FIGS. 7A through 7C, illustrating the interconnection between the interlock mechanism and child seat latching mechanism in greater detail.
Figure 10B:
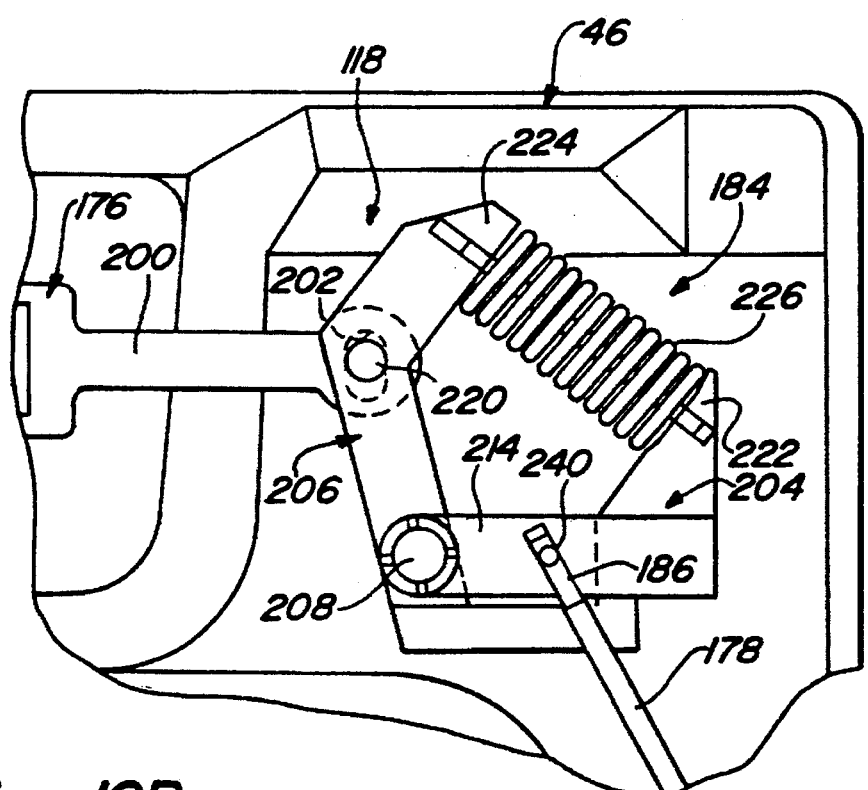
Figure 10C:
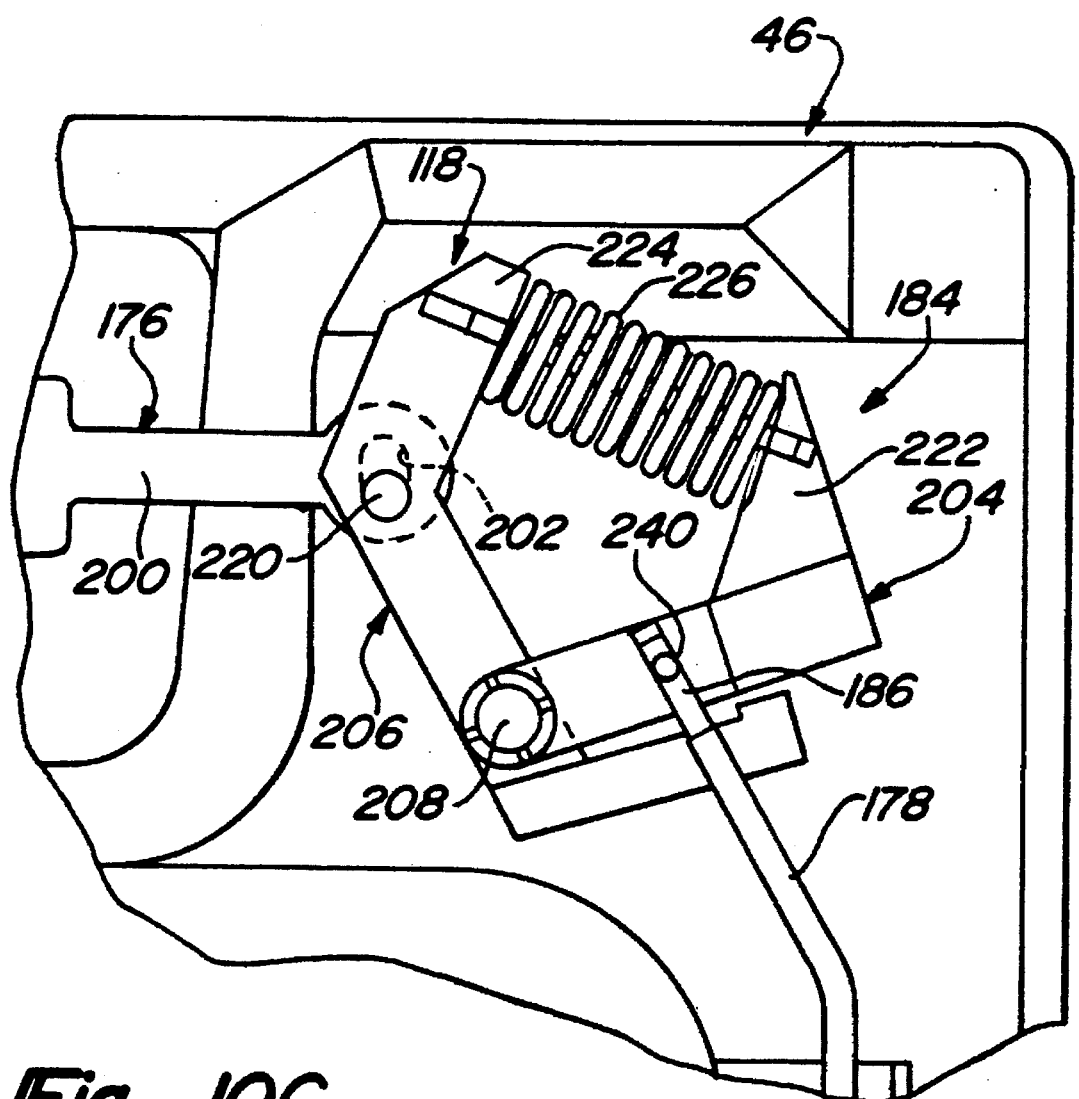

With initial reference to FIGS. 7A, 8A, 9A and 10A, the cooperating components of interlock system 102 of the first preferred embodiment of the present invention are shown with panel assembly 46 unlatched and integral child seat 24 locked in its stowed position. In FIG. 8A, panel assembly 46 is shown rotated slightly from its upright position so that extension 156 of locking pawl 136 is displaced from slide plate 176. Further, slide plate 176 is shifted rightwardly due to the biasing force exerted thereon by torsion spring 230. Resultantly, bellcrank device 184 is shown in FIG. 10A to have been rotated clockwise and rod 178 is displaced downwardly, thereby causing corresponding pivotal movement of hooked lock plate 160 into its latched position. As a result, child seat latching mechanism 112 is placed in its latched mode in response to seatback latching mechanism 104 being shifted into its unlocked mode, thereby releasing seatback panel 16 for folding movement and concurrently prohibiting deployment of integral child seat 24.

Referring now to FIGS. 7B, 8B, 9B and 10B, panel assembly 46 has been rotated to and latched in its upright position. Thus, the components of seat interlock system 102 are illustrated with panel assembly 46 in its latched position and integral child seat 24 in its stowed position. Specifically, seatback latching mechanism 104 is operating in its locked mode and child seat latching mechanism 112 is operating in its released mode. As panel assembly 46 is articulated upward toward its upright orientation, striker 124 of striker assembly 108 engages locking pawl 136 causing it to rotate in a second direction (i.e., clockwise) to its latched position shown in FIG. 9B. Striker 124 is now retained within lock slot 140, thereby preventing articulation of panel assembly 46 from its upright position to its folded position. As seen, detent projection 146 of cam plate 138 is positioned within detent notch 150 of locking pawl 136 to maintain locked engagement therebetween. When locking pawl 136 is moved to its latched position, pawl extension 156 extends within aperture 194 of slide plate 176 and engages first stop surface 196 and forcibly moves slide plate 176 leftwardly in opposition to the biasing exerted thereon by bellcrank assembly 184. With locking pawl 136 in its latched position, bellcrank device 184 is rotated counterclockwise about pivot 208, thereby causing rod 178 to shift upwardly and move hooked lock plate 160 to its first released position. Integral child seat 24 is now permitted to be deployed, if so desired. However, if integral child seat 24 remains stowed, release mechanism 110 can be activated through manual actuator 154 to rotate cam plate 138 and thereby permit locking pawl 136 to again move to its unlatched position for releasing striker 124 from lock slot 140.

With specific reference to FIGS. 6B, 7C, 8C, 9C and 10C, panel assembly 46 is latched in its upright position and integral child seat 24 has been fully deployed. When integral child seat 24 is moved from its stowed position to its fully deployed position, cam plate 174 engages cam follower 172 on lock plate 160 and forcibly rotates lock plate 160 clockwise, as shown in FIG. 6B. Such rotation of lock plate 160 serves to upwardly displace rod 178 which, in turn, causes leftward movement of slide plate 176 through counterclockwise rotation of bellcrank device 184. In addition, such rotation of lock plate 160 displaces rod 178 rightwardly (as shown in FIG. 6B) so that aperture 182 is shifted overcenter with respect to the pivot axis of lock plate 160. As a result, downward force from rod 178 will not permit lock plate 160 to rotate counterclockwise. With slide plate 176 moved leftward, second stop surface 198 engages pawl extension 156, thereby prohibiting movement of locking pawl 136 to its unlatched position until integral child seat 24 is first returned to its stowed position.

With continued reference to FIGS. 6A and 6B, the operation of the inertia responsive latching mechanism 120 of the present invention will now be described. When panel assembly 46 is in its latched position and integral child seat 24 is in its stowed position, deployment of integral child seat 24 is normally permitted. However, the inertia responsive latching mechanism 120 functions to prevent deployment of integral child seat 24 when seatback panel 16 is subject to excessive deceleration forces. Thus, inertial responsive latching mechanism 120 functions to prohibit deployment of integral child seat 24 under high deceleration circumstances. When integral child seat 24 is moved from its deployed position to its stowed position, striker plate 268 engages an underside of latch member 260 and forcibly rotates latch member 260 to its latched position. When the deceleration forces diminish below the predetermined minimum, latch member 260 rotates back to its released position as movement of integral child seat 24 from its stowed position is initiated, thereby permitting deployment of integral child seat 24.

While one particular type of pivoting latch-type inertial responsive mechanism has been disclosed, it will be appreciated that any suitable inertial-sensitive locking device is an equivalent device thereto within the fair scope of this invention.

Figure 11:
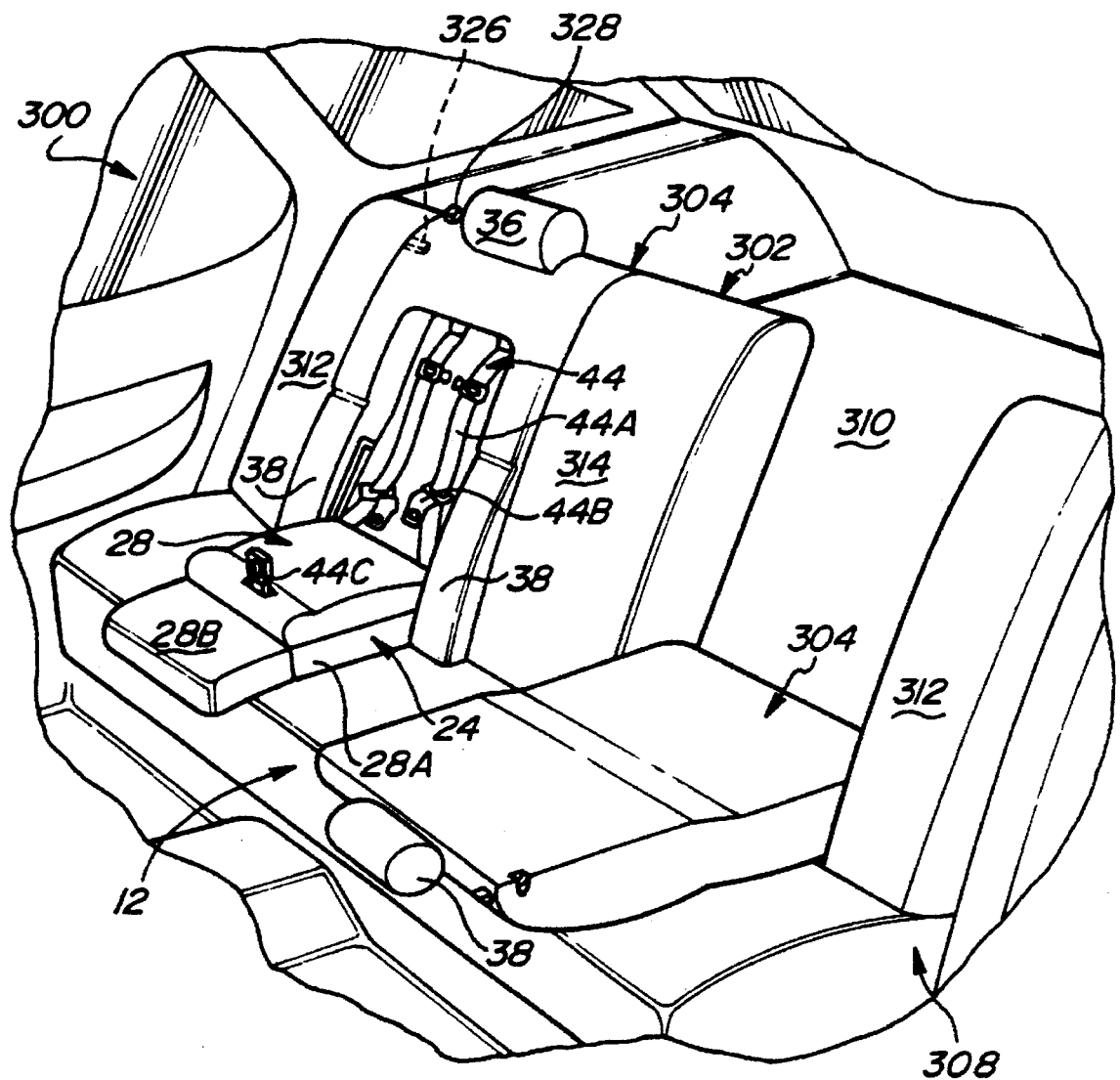
FIG. 11 is a perspective view of a rear seating area of a vehicle incorporating an vehicle seat unit constructed in accordance with the teachings of a second preferred embodiment of the present invention.

Referring now to FIGS. 11, 12, 13A–13C, and 14A–14D, a second preferred embodiment of the present invention will now be described. FIG. 11 illustrates a portion of a rear seating area 300 of a vehicle having a seatback 302 incorporating a pair of fold-down seatback panels 304. Each seatback panel 304 has a vehicle seat interlock system 306 constructed in accordance with the teachings of the second preferred embodiment of the present invention. Interlock system 306 of the second preferred embodiment includes various elements similar to the first preferred embodiment. As such, like reference numerals are used to identify components that are substantially identical to those previously described. As will become apparent, interlock system 306 of the second preferred embodiment of the present invention is specifically adapted for use in motor vehicle rear seat applications for wagon-type vehicles (e.g. station wagons, minivans, sport utility vehicles, and the like). As with the first preferred embodiment, those skilled in the art will understand that rear seating area 300 may alternatively incorporate only a single fold-down seatback panel 304.

With specific reference to FIG. 11, rear seat 308 is functionally incorporated into a wagon-type vehicle and is illustrated separating rear seating area 300 of the occupant compartment from a rear storage area 310. Rear seat 300 is illustrated to include seat cushion 12 and seatback 302 having a pair of fold-down seatback panels 304 pivotally mounted to structural portions of the vehicle. Seatback panels 304 are pivotally mounted for movement between a generally upright position and a forwardly folded position. As illustrated, seatback panels 304 are particularly well-adapted for incorporation into rear seating applications wherein the motor vehicle does not include a rear package shelf (identified in FIG. 1 in connection with the first preferred embodiment as reference numeral 22). In the embodiment illustrated, cushioned end portions 312 form a fixed portion of seatback 302, while cushioned center portion 314 is interconnected with one of seatback panels 304 for pivotal movement therewith. Alternatively, cushioned end portions 312 may also be mounted to seatback panels 304 for pivotal movement therewith and/or cushioned center portion 314 may be fixedly mounted independently from seatback panels 304.

According to the second preferred embodiment, seat interlock system 306 is operable for preventing deployment of integral child seat 24 when panel assembly 46 is not securely latched to a first or seatback latching mechanism 320 in its upright position. As will be detailed, seatback latching mechanism 320 includes a latch assembly 324 mounted to and carried by panel assembly 46; a striker member 326 extending from a fixed portion of seatback 18 (e.g., cushioned end portion 312) and which is engageable with latch assembly 324 for locking seatback panel 304 in the upright position; and a release mechanism 328 for permitting selective release of seatback panel 304 from its upright position. Thus, seatback latching mechanism 320 is operable in a "locked" mode for holding seatback panel 304 in its upright position and in an "unlocked" mode for permitting seatback panel 304 to be folded.

Moreover, seat interlock system 306 includes a second or child seat latching mechanism 112 which is similar to the similarly-identified child seat latching mechanism of the first preferred embodiment. As with the first embodiment, child seat latching mechanism 112 functions in a "latched" mode and a "released" mode. As will become apparent below, the child seat latching mechanism operates in its latched mode to mechanically lock integral child seat 24 in its stowed position when seatback latching mechanism 320 is in its unlocked mode. In its released mode, child seat latching mechanism 112 functions to permit deployment of integral child seat 24 when seatback latching mechanism 320 is in its locked mode.

As noted, seatback latching mechanism 320 preferably includes latch assembly 324 and striker member 326. Latch assembly 324 and striker member 326 are operatively arranged for releasably locking panel assembly 46 in its upright position in a flush relationship with cushioned end portion 312 and cushioned center portion 314. As illustrated, latch assembly 324 is disposed within a housing 330 which is fixedly secured to a portion of panel assembly 46. Striker member 326 is illustrated in phantom in FIG. 11 extending inwardly from a side surface (not specifically shown) of cushioned end portion 312. It will be understood that striker member 326 can alternatively be mounted to extend directly from the structure of the vehicle if cushioned end portion 312 is eliminated.

As best seen from FIGS. 14A–14D, latch assembly 324 is shown to include a latch member in the form of a locking pawl 336 which cooperates with a first interlock member in the form of a spring-biased cam plate 338 for releasably retaining striker member 326 within a lock slot 340 formed in locking pawl 336. More particularly, locking pawl 336 is mounted within housing 330 for pivotal movement about a pivot pin 342. A biasing mechanism in the form of a torsion spring 344 biases locking pawl 336 in a first direction (i.e., counterclockwise in FIGS. 14A–14D). Cam plate 338 is likewise mounted for pivotal movement about a pivot pin 346 and is normally biased by a torsion spring 348 toward locking pawl 336 (i.e., counterclockwise in FIGS. 14A–14D) so as to normally maintain engagement between a first leg 350 of cam plate 338 and either a first arm 352 or a second arm 354 of locking pawl 336.

Locking pawl 336 is movable about pivot pin 342 between an unlatched position shown in FIGS. 14A and 14B and a latched position shown in FIGS. 14C and 14D. In the unlatched position, striker member 326 is released from lock slot 340 of locking pawl 336 and first leg 350 of cam plate 338. First leg 350 rides on a surface segment 356 of second arm 354 of locking pawl 336. In the latched position, striker member 326 is positioned within lock slot 340 and a stop shoulder 358 formed on first leg 350 of cam plate 338 retains first arm 352 thereof, prohibiting counterclockwise rotation of locking pawl 336 to its unlatched position. As will be detailed, FIG. 14C illustrates the latched position of locking pawl 336 when integral child seat 24 is in its stowed position and FIG. 14D illustrates the latched position of locking pawl 336 when integral child seat 24 is in its deployed position.

To facilitate movement of locking pawl 336 from its latched position (FIGS. 14C and 14D) to its unlatched position (FIGS. 14A and 14B), release mechanism 328 includes a manually operably button 360 operably interconnected with cam plate 338 for displacing cam plate 338 from its normally biased engagement with locking pawl 336. More specifically, button 360 is attached to a downwardly extending plunger 362. Plunger 362 is coupled to cam plate 338 through a coupling member 364 which is pivotally mounted to housing 330 through a pivot pin 366. A torsion spring 367 surrounds pivot pin 366 and biases coupling member 364 in a counterclockwise direction. A first end 368 of coupling member 364 terminates in a generally circular portion 370 which is rotatably captured between an upper stop surface in the form of a first flange 372 and a lower stop surface in the form of a second flange 374, each of which are preferably integrally formed with plunger 362. A second end 376 of coupling member 364 terminates in a portion formed to include an elongated guide slot 378 for receiving a guide pin 380 extending from a second leg 381 of cam plate 338. When button 360 of release mechanism 328 is depressed, plunger 362 is displaced downwardly and forcibly rotates coupling member 364 clockwise against the bias of resiliently torsion spring 367. As a result, cam plate 338 is correspondingly rotated clockwise against the normal bias of torsion spring 348, thereby permitting locking pawl 336 to rotate counterclockwise under the biasing force of torsion spring 344 to its unlatched position.

With continued reference to FIGS. 14A–14D and additional reference to FIGS. 13A–13C, seat interlock system 306 of the second preferred embodiment is illustrated to include a means for coordinating selective operation of seatback latching mechanism 320 and child seat latching mechanism 112. In particular, interlock system 306 includes a second interlock member in the form of two-piece connecting rod assembly 390 having a first link 392 pivotally coupled by pivot pin 394 to a second link 396. As shown in FIGS. 13A–13C, the free end of first link 392 is mounted in aperture 182 in lock plate 160. An upper end 398 of second link 396 is received into an elongated slot (not specifically shown) formed in a lower end 400 of plunger 362. Second link 396 further includes an elongated slot 402 (shown in hidden lines in FIGS. 14A–14C) formed in a central portion which receives a retaining pin 404 attached to housing 330 for preventing horizontal displacement thereof. Preferably, a tension spring (not shown) interconnects rod assembly 290 and panel assembly 46 and is operative for upwardly biasing rod assembly 390.

With initial reference to FIG. 14A, the cooperating components of interlock system 306 of the second preferred embodiment of the present invention are shown with button 360 in a manually depressed position, thereby permitting locking pawl 336 to rotate counterclockwise to its unlatched position. Plunger 362 and connector arm 394 are illustrated slightly downwardly displaced, coupling member 364 is rotated counterclockwise against the normal biasing force of torsion spring 367, and cam plate 338 is rotated clockwise against the normal biasing force of torsion spring 348.

Referring now to FIGS. 13A and 14B, panel assembly 46 has been rotated away from its upright position and the manually applied force has been removed from button 360, thereby permitting rod assembly 390, plunger 362 and button 360 to slightly displace upwardly under the biasing force of the tension spring interconnecting rod assembly 390 and panel assembly 46. Such upward displacement of plunger 362 results in engagement between flange 374 and circular portion 370 of coupling member 364. Accordingly, the components of seat interlock system 306 are illustrated with panel assembly 46 in its unlatched position and integral child seat 24 in its stowed position. Engagement between first leg 350 of cam plate 338 and surface segment 356 of second arm 354 prevents counterclockwise rotation of cam plate 338. As a result, coupling member 364 is prevented from rotating in a counterclockwise direction and rod assembly 390 cannot be displaced upwardly. Thus, deployment of integral child seat 24 is prevented.

Referring now to FIG. 13B and 14C, panel assembly 46 has been rotated to and latched in its upright position. Thus, the components of seat interlock system 306 are illustrated with panel assembly 46 in its upright position and integral child seat 24 in its stowed position. Specifically, seat latching mechanism 322 is operated in its locked mode and child seat latching mechanism 112 is operating in its released mode. As panel assembly 46 is articulated upward towards its upright orientation, striker member 326 engages locking plate 336, thereby causing it to rotate in a second direction (i.e., clockwise) to its latched position shown in FIG. 14C. When first arm 352 of locking plate 336 rotates clockwise past first leg 350 of cam plate 338, cam plate 338 and coupling member 364 are each permitted to rotate slightly in a counterclockwise direction. As a direct result, a small gap is created between flange 372 of plunger 362 and circular portion 370 of coupling member 364 so that first link 392 and second link 396 of connecting rod 390 are permitted to be displaced upwardly a sufficient amount to permit rotation of hooked lock plate 160 to its released position. Striker member 326 is now retained within lock slot 340, thereby preventing articulation of panel assembly 46 from its upright position to its folded position. Integral child seat 24 is now permitted to be deployed, if so desired. However, if integral child seat 24 remains stowed, release mechanism 328 can be activated through manual button 360 to rotate cam plate 338 and thereby permit locking plate 336 to again move to its unlatched position for releasing striker member 326 from lock slot 340.

With specific reference to FIG. 13C and 14D, panel assembly 46 rotated to and is latched in its upright position and integral child seat 24 has been fully deployed. When integral child seat 24 is moved from its stowed position (shown in FIG. 13B) to its fully deployed position (shown in FIG. 13C), cam plate 174 engages cam follower 172 on lock plate 160 and forcibly rotates lock plate 160 clockwise as shown in FIG. 13C. Such rotation of lock plate 160 serves to upwardly displace first link 392 of connecting rod assembly 390, which in turn, causes upward displacement of second link 396 of connecting rod assembly 390 and plunger 362. Furthermore, such rotation of lock plate 160 displaces the lower end of second link 396 of connecting rod 390 leftwardly (as shown in FIG. 13C) and positions lock plate 160 immediately adjacent panel assembly 46. In this position, aperture 182 is shifted overcenter with respect to the pivot axis of lock plate 160 defined by pivot pin 164. As a result, downward force from connecting rod assembly 390 will not permit lock plate 160 to rotate clockwise and counterclockwise rotation of locking plate 160 will be prevented by panel assembly 46. With plunger 362 forcibly displaced upwardly, button 360 cannot be depressed, thereby prohibiting movement of locking plate 336 to its unlatched position until integral child seat 24 is first returned to its stowed position.

Also similar to the first preferred embodiment, seat interlock system 306 of the second preferred embodiment incorporates inertia-responsive latch mechanism 120 that is operative for automatically securing integral child seat 24 in its stowed position when the motor vehicle is subjected to significant deceleration forces. A complete description of inertia-responsive latch mechanism 120 is provided above with respect to the first preferred embodiment.

The foregoing discussion discloses and describes two presently preferred embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An interlock system for a vehicular seat adapted to be secured to a mounting structure in a motor vehicle, the vehicular seat of the type having a seat cushion, a fold-down seatback panel supported for movement between an upright position and a folded position, and an integral child seat built into the seatback panel for movement between a stowed position and a deployed position, said interlock system comprising:

a first latching mechanism operable in a locked mode for releasably locking the seatback panel in the upright position and in an unlocked mode for permitting movement of the seatback panel from the upright position to the folded position, said first latching mechanism including a first striker member secured to the mounting structure and a first latch member supported on said seatback panel for movement between a first position whereat said first striker member is lockingly retained by said first latch member for establishing said locked mode and a second position whereat said first striker member is released from locked engagement with said first latch member for establishing said unlocked mode;

a second latching mechanism operable in a latched mode for locking the integral child seat in the stowed position and in a released mode for permitting movement of the integral child seat from the stowed position to the deployed position; and an interlock mechanism operably interconnecting said first and second latching mechanisms for preventing shifting of said second latching mechanism from its released mode to its latched mode when said first latching mechanism is in its unlocked mode, and said interlock mechanism further operable for preventing shifting of said first latching mechanism to its unlocked mode when said second latching mechanism is in its released mode.

2. The interlock system of claim 1 further comprising a third latching mechanism operable for releasably locking the integral child seat in the stowed position when the vehicular seat is subject to a decreasing force in excess of a predetermined value.

3. The interlock system of claim 2 wherein said third latching mechanism is an inertia-responsive latching mechanism including a latch member supported on the seatback panel for movement relative to a striker member mounted on the integral child seat, said latch member being normally biased toward an unlatched position displaced from said striker member for permitting unrestricted deployment of said integral child seat from the stowed position, and wherein said latch member is adapted to move to a latched position capturing said striker member in response to a deceleration force being exerted thereon having a magnitude exceeding said predetermined threshold value for inhibiting deployment of the integral child seat from the stowed position.

4. The interlock system of claim 3 wherein said second latching mechanism includes a second striker member secured to the integral child seat and a second latch member supported on the seatback panel for movement between a third position displaced from said second striker member for establishing said released mode and a fourth position engaging said second striker bar for establishing said latched mode.

5. The interlock system of claim 4 wherein said interlock mechanism includes an interlock member adapted to be selective engageable with said first latch member, a rod assembly interconnected to said second latch member, and a coupling member interconnecting said first interlock member to said rod assembly for coordinating movement therebetween, whereby movement of said first latch member from said first position to said second position prevents movement of said second latch member from said fourth position to said third position so as to prevent deployment of said integral child seat when said seatback panel is in its upright position, and movement of said second latch member from said fourth position to said third position so as to secure said seatback panel in its upright position when said child seat is deployed.

6. The interlock system of claim 5 further comprising a release mechanism for permitting said first latch member to be selectively moved from said first position to said second position when the seatback panel is in its upright position to release the seatback panel for subsequent movement to its folded position, said release mechanism including a manually operable button interconnected with a plunger, said plunger being interconnected with said rod assembly and said coupling member.

7. The interlock system of claim 5 wherein said second latching mechanism further includes a cam follower secured to said second latch member and a cam plate secured to said second striker member such that movement of the integral child seat from its stowed position to its deployed position causes said cam plate to engage said cam follower and pivot said second latch member from said third position to said fourth position causing concurrent movement of said rod assembly in a first direction.

8. The interlock system of claim 7 wherein movement of said first latch member to said first position prevents displacement of said rod assembly in a second direction.

9. A vehicular seat adapted to be secured to a mounting structure in a motor vehicle comprising:

a seat cushion;

a seatback panel supported for movement between an upright position and a folded position;

a seatback latching mechanism operable in a locked mode for securing said seatback panel to the mounting structure when said seatback panel is in said upright position and in an unlocked mode for permitting movement of said seatback panel from said upright position to said folded position, said seatback latching mechanism including a first striker member secured to the mounted structure, and a first latch member supported said seatback panel for movement between a first position whereat said first striker member is lockingly retained by said first latch member for establishing said locked mode and a second position whereat said first striker member is released from locked engagement with said first latch member for establishing said unlocked mode;

an integral child seat built into said seatback panel for movement between a stowed position and a deployed position;

a child seat latching mechanism operable in a latched mode for locking said integral child seat in said stowed position and in a released mode for permitting movement of said integral child seat from said stowed position to said deployed position; and an interlock mechanism operably interconnecting said seatback latching mechanism to said child seat latching mechanism for preventing shifting of said child seat latching mechanism from its latched mode into its released mode when said seatback latching mechanism is in its unlocked mode and further preventing shifting of said seatback latching mechanism to its unlocked mode when said child seat latching mechanism is in its released mode.

10. The vehicular seat of claim 9 further comprising a third latching mechanism operable for releasably locking the integral child seat in the stowed position when the vehicular seat is subject to a decreasing force in excess of a predetermined value.

11. The vehicular seat of claim 10 wherein said third latching mechanism is an inertia-responsive latching mechanism including a latch member supported on the seatback panel for movement relative to a striker member mounted on the integral child seat, said latch member being biased toward an unlatched position displaced from said striker member for permitting unrestricted deployment of said integral child seat from the stowed position, and wherein said latch member is adapted to move to a latched position capturing said striker member in response to a deceleration force being exerted thereon having a magnitude exceeding said predetermined threshold value for inhibiting deployment of the integral child seat from the stowed position.

12. The vehicular seat of claim 10 wherein said child seat latching mechanism includes a second striker member secured to said integral child seat and a second latch member supported on said seatback panel for movement between a third position displaced from said second striker member for establishing said released mode and a fourth position engaging said second striker bar for establishing said latched mode, and wherein said interlock mechanism includes a first interlock member adapted to be selective engageable with said first latch member, a second interlock member connected to said second latch member, and a coupling member interconnecting said first interlock member to said second interlock member for coordinating movement therebetween, whereby movement of said first latch member from said first position to said second position prevents movement of said second latch member from said fourth position to said third position so as to prevent deployment of said integral child seat when said seatback panel in its folded position, and movement of said second latch member from said fourth position to said third position prevents movement of said first latch member from said second position to said first position so as to secure said seatback panel in its upright position when said child seat is deployed.

13. The vehicular seat of claim 12 further comprising a release mechanism for permitting said first latch member to be selectively moved from said first position to said second position when said seatback panel is in its upright position to release said seatback panel for subsequent movement to its folded position, said release mechanism including a manually operable button interconnected with a plunger, said plunger being interconnected with said rod assembly and said coupling member.

14. The vehicular seat of claim 13 wherein said first interlock member is a cam plate including a detent projection for engaging said first latch member and selectively preventing rotation of said first latch member from said second position to said first position.

15. The vehicular seat of claim 14 wherein said child seat latching mechanism further includes a cam follower secured to said second latch member and a cam plate secured to said second striker member such that movement of said integral child seat from its stowed position to its deployed position causes said cam plate to engage said cam follower and pivot said second latch member from said third position to said fourth position causing concurrent movement of said rod in a first direction.

16. The vehicular seat of claim 15 wherein movement of said first latch member to said first position prevents said rod to be displaced in a second direction.

17. An interlock system for a vehicular seat adapted to be secured to a mounting structure in a motor vehicle, the vehicular seat of the type having a seat cushion, a fold-down seatback panel supported for movement between an upright position and a folded position, and an integral child seat built into the seatback panel for movement between a stowed position and a deployed position, said interlock system comprising:

a first latching mechanism operable in a locked mode for releasably locking the seatback panel in the upright position and in an unlocked mode for permitting movement of the seatback panel from the upright position to the folded position, a first interlock member adapted to be selective engageable with said first latch member, a second interlock member connected to said second latch member, and a coupling member interconnecting said first interlock member to said second interlock member for coordinating movement therebetween;

a second latching mechanism operable in a latched mode for locking the integral child seat in the stowed position and in a released mode for permitting movement of the integral child seat from the stowed position to the deployed position;

an interlock mechanism operably interconnecting said first and second latching mechanisms for preventing shifting of said second latching mechanism from its released mode to its latched mode when said first latching mechanism is shifted to its unlocked mode, and said interlock mechanism further operable for preventing shifting of said first latching mechanism to its unlocked mode when said second latching mechanism is shifted to its released mode, said interlock mechanism including a first interlock member adapted to be selective engageable with said first latch member, a second interlock member connected to said second latch member, and a coupling member interconnecting said first interlock member to said second interlock member for coordinating movement therebetween; and a third latching mechanism operable for releasably locking the intergral child seat in the stowed position when the vehicular seat is subjected to a deceleration force in excess of a predetermined threshold value.

18. The interlock system of claim 17 wherein said third latching mechanism is an inertia-responsive latching mechanism including a latch member supported on the seatback panel for movement relative to a striker member mounted on the integral child seat, said latch member biased toward an unlatched position displaced from said striker member for permitting unrestricted deployment of said integral child seat from the stowed position, and wherein said latch member is adapted to move to a latched position capturing said striker member in response to a deceleration force being exerted thereon having a magnitude exceeding said predetermined threshold value for inhibiting deployment of the integral child seat from the stowed position.

19. The interlock system of claim 18 wherein said latch member is rotationally interconnected with said panel assembly and said striker member is secured to said integral child seat.

20. The interlock system of claim 19 wherein said latch member includes a downwardly extending portion operable to engage said striker member such that said striker member is moved toward its latched position as said integral child seat is moved toward its stowed position.

* * * * *